(12) United States Patent
Murakoshi

(10) Patent No.: US 11,170,216 B2
(45) Date of Patent: Nov. 9, 2021

(54) INFORMATION PROCESSING APPARATUS, INFORMATION PROCESSING METHOD, PROGRAM, AND GROUND MARKER SYSTEM

(71) Applicant: Sony Network Communications Inc., Tokyo (JP)

(72) Inventor: Sho Murakoshi, Tokyo (JP)

(73) Assignee: SONY NETWORK COMMUNICATIONS INC., Tokyo (JP)

( * ) Notice: Subject to any disclaimer, the term of this patent is extended or adjusted under 35 U.S.C. 154(b) by 78 days.

(21) Appl. No.: 16/476,301

(22) PCT Filed: Nov. 13, 2017

(86) PCT No.: PCT/JP2017/040718
§ 371 (c)(1),
(2) Date: Jul. 8, 2019

(87) PCT Pub. No.: WO2018/135110
PCT Pub. Date: Jul. 26, 2018

(65) Prior Publication Data
US 2019/0354742 A1    Nov. 21, 2019

(51) Int. Cl.
*G06K 9/00*    (2006.01)
*G06T 7/62*    (2017.01)
(Continued)

(52) U.S. Cl.
CPC ............ *G06K 9/0063* (2013.01); *G01C 11/04* (2013.01); *G01C 15/06* (2013.01); *G06T 7/62* (2017.01);
(Continued)

(58) Field of Classification Search
CPC ............ G06K 9/0063; G06K 2209/40; G06K 9/00201; G06T 7/62; G06T 7/90;
(Continued)

(56) References Cited

U.S. PATENT DOCUMENTS 8,712,163 B1 * 4/2014 Osheroff ............ G06K 9/00577
382/195
10,220,964 B1 * 3/2019 Sperindeo ............ H04N 5/2251
(Continued)

FOREIGN PATENT DOCUMENTS

JP    60-4910 U    1/1985
JP    6-294618 A    10/1994
(Continued)

OTHER PUBLICATIONS

International Search Report and Written Opinion dated Feb. 6, 2018 for PCT/JP2017/040718 filed on Nov. 13, 2017, 10 pages including English Translation of the International Search Report.

*Primary Examiner* — Kim Y Vu
*Assistant Examiner* — Molly Delaney
(74) *Attorney, Agent, or Firm* — Xsensus LLP

(57) ABSTRACT

To make it possible to set a parameter, which is used for detection of a mark attached to a ground marker, according to the feature of the mark.
Provided is an information processing apparatus including: an acquisition unit that acquires a captured image; a detection unit that detects a feature of a target object in the captured image; and a determination unit that determines, on the basis of the feature, a parameter used for an assessment of whether or not the target object is a predetermined object.

16 Claims, 15 Drawing Sheets

(51) Int. Cl.
*G06T 7/90* (2017.01)
*G01C 11/04* (2006.01)
*G01C 15/06* (2006.01)

(52) U.S. Cl.
CPC ...... *G06T 7/90* (2017.01); *G06T 2207/10024* (2013.01); *G06T 2207/10032* (2013.01); *G06T 2207/30188* (2013.01); *G06T 2207/30204* (2013.01)

(58) Field of Classification Search
CPC . G06T 2207/10024; G06T 2207/10032; G06T 2207/30188; G06T 2207/30204; G01C 11/04; G01C 15/06
See application file for complete search history.

(56) References Cited

U.S. PATENT DOCUMENTS

| | | | |
|---|---|---|---|
| 2011/0122257 A1 | 5/2011 | Kirk | |
| 2011/0305392 A1* | 12/2011 | Kapoor | G06K 9/4642 382/174 |
| 2012/0263346 A1* | 10/2012 | Datta | G06K 9/4604 382/103 |
| 2013/0321582 A1* | 12/2013 | Huang | G01B 11/2545 348/46 |
| 2014/0132769 A1* | 5/2014 | Kido | G06K 9/00791 348/148 |
| 2015/0070347 A1* | 3/2015 | Hofmann | G06T 19/006 345/419 |
| 2015/0235110 A1* | 8/2015 | Curtis | G06K 9/00677 382/224 |
| 2015/0248579 A1* | 9/2015 | Zhang | G06K 9/00637 382/173 |
| 2016/0025499 A1* | 1/2016 | Moore | H04N 13/239 701/1 |
| 2016/0086050 A1* | 3/2016 | Piekniewski | B25J 9/1664 382/103 |
| 2016/0375592 A1* | 12/2016 | Szatmary | B25J 9/1676 700/255 |
| 2017/0221226 A1* | 8/2017 | Shen | G06T 7/80 |
| 2017/0293800 A1* | 10/2017 | Babenko | G06K 9/6255 |
| 2018/0024562 A1* | 1/2018 | Bellaiche | G06T 7/73 701/26 |
| 2018/0232900 A1* | 8/2018 | Kraft | G06K 9/4609 |
| 2019/0025858 A1* | 1/2019 | Bar-Nahum | B64D 47/08 |
| 2019/0187724 A1* | 6/2019 | Li | G05D 1/042 |
| 2019/0265722 A1* | 8/2019 | Haeusler | G05D 1/0272 |

FOREIGN PATENT DOCUMENTS

| | | |
|---|---|---|
| JP | 8-54927 A | 2/1996 |
| JP | 2003-75149 A | 3/2003 |
| JP | 2005-62143 A | 3/2005 |
| JP | 2005-140550 A | 6/2005 |
| JP | 2010-91517 A | 4/2010 |
| JP | 2011-120076 A | 6/2011 |
| JP | 2014-126424 A | 7/2014 |

* cited by examiner

INFORMATION PROCESSING APPARATUS, INFORMATION PROCESSING METHOD, PROGRAM, AND GROUND MARKER SYSTEM

CROSS-REFERENCE TO RELATED APPLICATIONS

The present application is based on PCT filing PCT/JP2017/040718, filed Nov. 13, 2017, which claims priority to JP 2017-008287, filed Jan. 20, 2017, the entire contents of each are incorporated herein by reference.

TECHNICAL FIELD

The present disclosure relates to an information processing apparatus, an information processing method, a program, and a ground marker system.

BACKGROUND ART

Recently, there has been proposed a technique for easily measuring a volume of soil by aerially photographing ground markers installed on the ground surface and creating a three-dimensional model of the ground on the basis of control points at which the ground markers included in the captured image obtained by the aerial photographing are installed (for example, Patent Document 1).

CITATION LIST

Patent Document

Patent Document 1: Japanese Patent Application Laid-Open No. 2005-140550

SUMMARY OF THE INVENTION

Problems to be Solved by the Invention

Here, with the existing technology, it is not possible to set a parameter, which is used for detecting a mark attached to the ground marker, according to the feature of the mark, and for this reason, a ground marker having a single mark attached thereto is used. As a result, an implementer has to carry the ground marker having a single mark attached thereto in order to install the ground marker, regardless of the environment of an area to be measured, and therefore, in a case where the area to be measured has an environment less accessible to the implementer, such as a mountainous area, the burden on the implementer for installing and collecting the ground marker is heavy.

Therefore, the present disclosure is made in view of the above, and the present disclosure provides a novel and improved information processing apparatus, an information processing method, a program, and a ground marker system, with which it is possible to set a parameter, which is used for detecting a mark attached to a ground marker, according to the feature of the mark.

Solutions to Problems

The present disclosure provides an information processing apparatus including: an acquisition unit that acquires a captured image; a detection unit that detects a feature of a target object in the captured image; and a determination unit that determines, on the basis of the feature, a parameter used for an assessment of whether or not the target object is a predetermined object.

Furthermore, the present disclosure provides an information processing method that is executed by a computer, the method including: acquiring a captured image; detecting a feature of a target object in the captured image; and determining, on the basis of the feature, a parameter used for an assessment of whether or not the target object is a predetermined object.

Furthermore, the present disclosure provides a program for causing a computer to execute: acquiring a captured image; detecting a feature of a target object in the captured image; and determining, on the basis of the feature, a parameter used for an assessment of whether or not the target object is a predetermined object.

Furthermore, the present disclosure provides a ground marker system including: a first ground marker provided with a first mark having a first feature; and a second ground marker provided with a second mark having a second feature different from the first feature, in which the size of the first mark and the size of the second mark are different from each other.

Effects of the Invention

As described above, according to the present disclosure, it is possible to set a parameter, which is used for detection of a mark attached to a ground marker, according to the feature of the mark.

Note that the effects described above are not necessarily limitative, and along with or instead of the above-described effects, any of the effects described in the present specification or other effects that can be expected from the present specification may be provided.

MODE FOR CARRYING OUT THE INVENTION

Preferred embodiments of the present disclosure will be described in detail below with reference to the accompanying drawings. Note that, in the present specification and the drawings, components that have substantially the same functional configuration are denoted with the same reference signs, and redundant description will be omitted.

Note that the description will be given in the following order.

1. Overview of embodiments
2. Functional configuration of apparatus (functional configuration of cloud server)
3. Operation of apparatus
4. Modification
5. Parameter setting method
6. Hardware configuration of cloud server
7. Remarks
8. Conclusion

1. OVERVIEW OF PRESENT DISCLOSURE (1-1. Overview of One Embodiment of the Present Disclosure)

Figure 1:
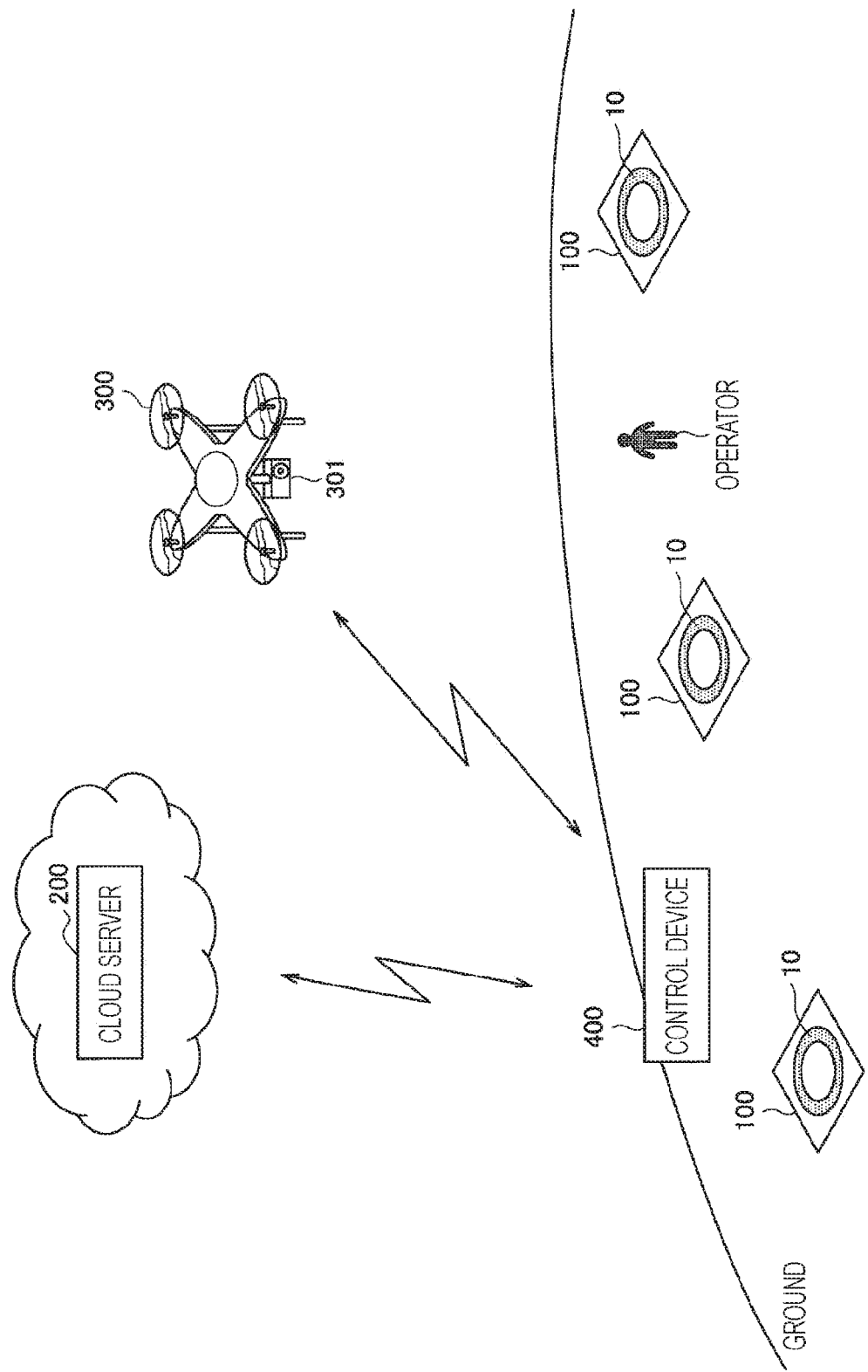
FIG. 1 is a diagram showing a soil volume measurement system according to an embodiment of the present disclosure.

One embodiment of the present disclosure relates to a soil volume measurement system. First, an overview of one embodiment of the present disclosure will be described with reference to FIG. 1. FIG. 1 is a diagram showing a soil volume measurement system according to an embodiment of the present disclosure.

As shown in FIG. 1, the soil volume measurement system according to the present embodiment includes a ground marker 100, a cloud server 200, a drone 300, and a control device 400. A predetermined mark 10 is attached to the ground marker 100.

With the soil volume measurement system according to the present embodiment, a volume of soil is measured using an unmanned aerial vehicle (UAV). More specifically, the volume of soil is measured by aerially photographing the ground marker 100 installed on the ground surface by the UAV and analyzing the generated captured image. In the present embodiment, the case where the drone 300 is used as the UAV will be described as an example.

The mark 10 attached to the ground marker 100 according to the present embodiment functions as a control point used for the measurement of the volume of soil. More specifically, an implementer performing the soil volume measurement installs the ground markers 100 having the marks 10 attached thereto at predetermined intervals (for example, several hundreds of meters) in a target area where the soil volume measurement is to be performed. The target area is aerially photographed by the drone 300. Thereafter, a three-dimensional model of the ground is created by associating a plurality of marks 10 detected from the captured image with information such as the horizontal position (latitude and longitude), and the elevation of the point at which each mark 10 is installed, and the measurement of the soil volume is performed on the basis of the three-dimensional model.

The drone 300 is a UAV that aerially photographs the target area where the soil volume measurement is to be performed and in which the marks 10 are installed. More specifically, various settings such as a flight route including the flight altitude are set in advance to the drone 300 by the implementer, and the drone 300 flies on the basis of the settings and aerially photographs the target area in which the marks 10 are installed. Then, the drone 300 transmits one or more captured images to the cloud server 200 as captured image data by wireless communication.

The cloud server 200 is an information processing apparatus that analyzes captured image data. More specifically, the cloud server 200 analyzes the captured image data received from the drone 300 and detects the marks 10. Then, the cloud server 200 generates a three-dimensional model of the ground by associating the detected marks 10 with information such as the latitude, longitude, and elevation of the point where each mark 10 is installed, and performs the measurement of the soil volume on the basis of the three-dimensional model.

The control device 400 is an information processing apparatus configured with a dedicated device that functions as a ground control station (ground station) (GCS). Alternatively, the control device 400 is configured with a device having a communication function, such as a personal computer (PC), a tablet, or a smartphone, executing a program for causing such a device to function as a GCS.

The control device 400 communicates with the drone 300 according to an operation performed by an operator to control the flight of the drone 300, acquire the position, instruct a camera 301 mounted on the drone 300 to capture an image, give an instruction on acquisition of the captured image captured by the camera 301, and so on.

The control device 400 can display the detection result of the ground marker 100 obtained by the detection process of the mark 10 by the cloud server 200 according to the operation performed by the operator. The operator can confirm from the detection result of the ground marker 100 whether or not the ground marker 100 has been appropriately photographed.

In a case where the ground marker 100 has not been appropriately photographed, for example, in a case where the ground marker 100 cannot be detected by the detection process, the operator flies again the drone 300 and causes the drone 300 to photograph the ground marker 100 by operating the control device 400.

Note that the control device 400 can upload the captured image acquired from the drone 300 to the cloud server 200. Furthermore, although the captured image acquired from the drone 300 is uploaded to the cloud server 200 via the control device 400 in the present embodiment, the configuration is not limited thereto. For example, the captured image acquired from the drone 300 or the current position of the drone 300 may be directly transmitted to the cloud server 200, not via the control device 400.

(1-2. Background)

The overview of one embodiment of the present disclosure has been described above. Subsequently, the background of the present disclosure will be described.

In the soil volume measurement system using UAV, the accuracy with which an image analysis program detects the mark attached to the ground marker mainly depends on the distance (almost equivalent to the altitude, and referred to as "altitude" hereinafter for convenience) from a photographing device to the mark and the size of the mark. More specifically, the image analysis program performs a mark detection process by setting various parameters in the image analysis program on the basis of the altitude at the time of photographing and the size of the mark. Therefore, as the difference between the information of the altitude at the time of photographing or the information of the size of the mark, which is used for setting a parameter, and actual information is increased, the detection accuracy of the mark decreases. Note that the detection accuracy of the mark is not necessarily increased with a decrease in altitude (and likewise, the detection accuracy of the mark is not necessarily decreased with an increase in altitude). Furthermore, the detection accuracy of the mark is not necessarily increased with an increase in the size of the mark (and likewise, the detection accuracy of the mark is not necessarily decreased with a decrease in the size of the mark). In other words, in order to improve the detection accuracy of the mark, it is desirable to select a more suitable parameter on the basis of the altitude and the size of the mark.

Figure 2:
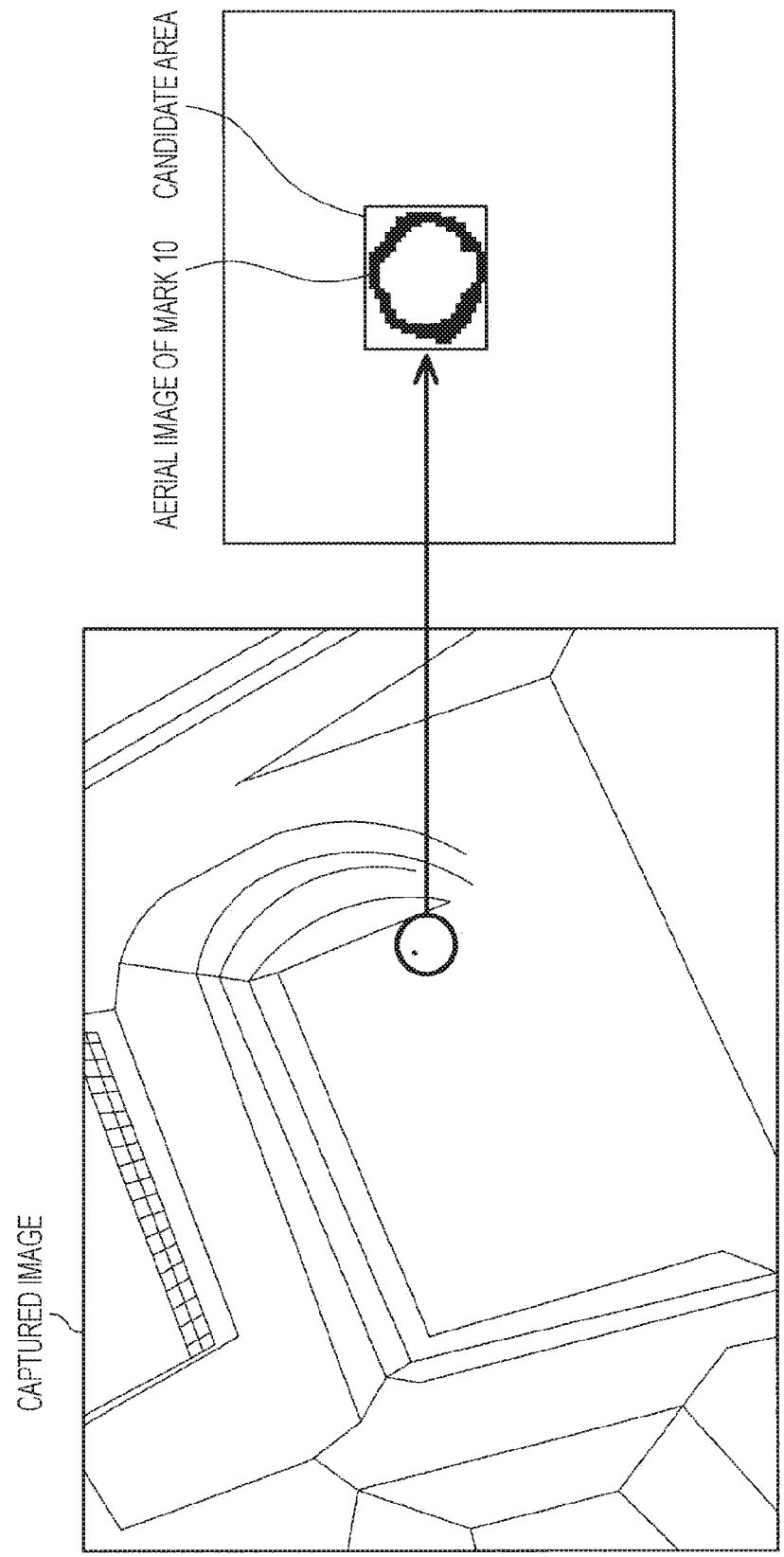
FIG. 2 is a view showing a mark on a ground marker aerially photographed by a UAV.

Here, the altitude at the time of photographing is specified on the basis of atmospheric pressure information measured by an atmospheric pressure sensor mounted on the UAV. On the other hand, identification of the size of the mark may be difficult due to the altitude at the time of photographing being high or the size of the mark being small. Here, more specific description will be given with reference to FIG. 2. FIG. 2 is a view showing the mark of the ground marker aerially photographed by the UAV.

For example, when the altitude at the time of photographing is several tens of [m] (for example, about 60 [m]) and the mark has a circular shape with a diameter of several tens of [cm] (for example, about 30 [cm]), the size of the mark is smaller with respect to the entire captured image, and therefore, the number of pixels (the amount of information) of the mark in the captured image is small as shown in FIG. 2. Therefore, it is difficult to identify the size of the mark by analysis of the captured image. From the above, in the existing technology, not a ground marker having marks of different sizes but a ground marker having a single mark with an appreciable size is often used.

Figure 3:
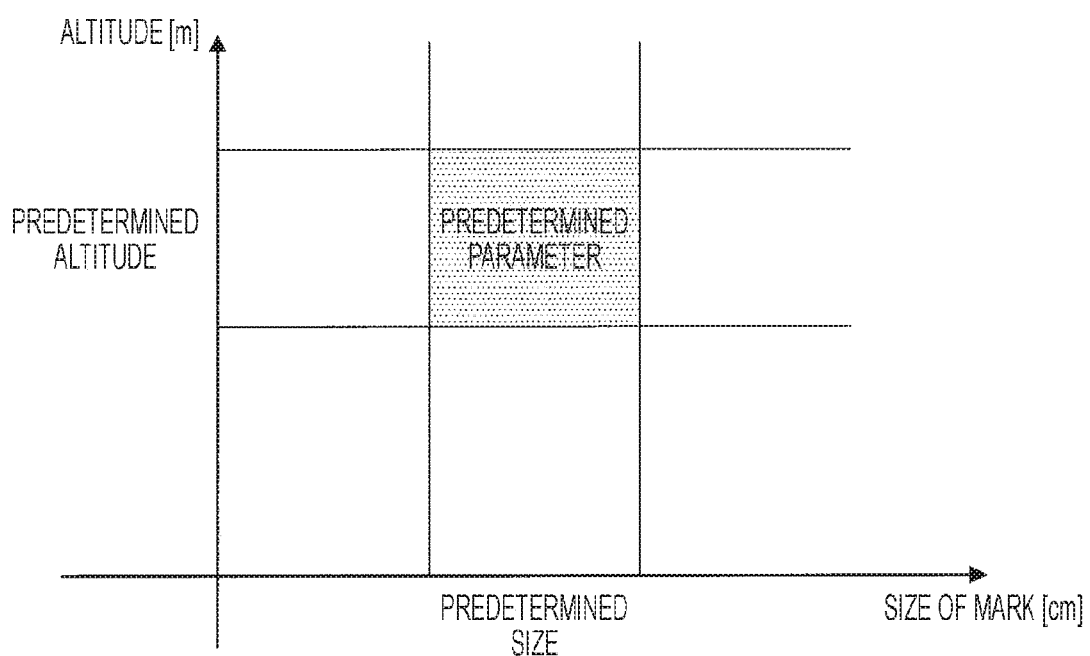
FIG. 3 is a diagram showing an example of setting a parameter in an existing technology.

From the above, in the existing soil volume measurement system, parameters of a program used for the detection of the mark are set on the basis of the altitude (described as "predetermined altitude" in the figure) set by the implementer in an advance flight planning and the size (described as "predetermined size" in the figure) of a single mark, as shown in FIG. 3. In this case, in a case where the UAV aerially captures an image at an altitude different from the altitude set in the flight plan, for example, there is a possibility of decrease in the detection accuracy of the mark.

Moreover, the use of the ground marker having a single mark with an appreciable size requires the implementer to carry the ground marker in order to install the ground marker, regardless of the environment of an area to be measured, and therefore, in a case where the area to be measured has an environment less accessible to the implementer, such as a mountainous area, the burden on the implementer for installing and collecting the ground marker is heavy.

Thus, focusing on the abovementioned points, the present disclosure proposes a method with which it is possible to detect, with higher accuracy than with the conventional method, a ground marker from a captured image obtained by photographing the ground marker. In one embodiment of the present disclosure, a plurality of types of ground markers 100 having marks 10 of different sizes is used, and the marks 10 attached to the respective ground markers 100 have different features depending on their sizes. In other words, if there are a first mark (a mark attached to a first ground marker) and a second mark (a mark attached to a second ground marker) which are different in size from each other, the first mark has a first feature corresponding to its size, and the second mark has a second feature corresponding to its size and different from the first feature. More specifically, the marks 10 attached to the respective ground markers 100 have different colors, color arrangements, shapes, or the like according to their sizes. Thus, the apparatus for analyzing the captured image detects information regarding the feature of the mark 10 from the captured image, assesses the size of the mark 10 on the basis of the detected feature, and sets a parameter on the basis of the size, thereby detecting the mark 10. As a result, the soil volume measurement system according to the present embodiment can set a parameter suitable for detecting the mark 10, so that the detection accuracy of the mark 10 can be improved.

(1-3. Overview of Function of Soil Volume Measurement System)

The background of the present disclosure has been described above. Subsequently, the function of the soil volume measurement system according to the present embodiment will be briefly described with reference to FIGS. 4 and 5.

Figure 4:
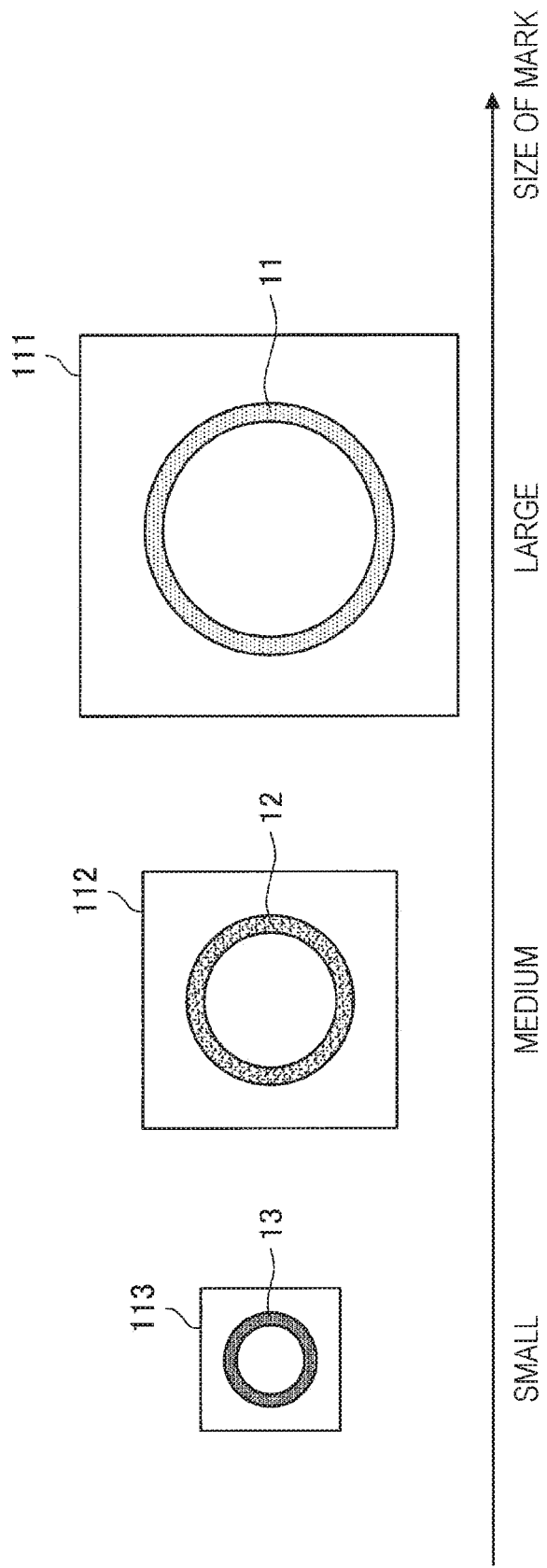
FIG. 4 is a view showing an example of a case where the color of a mark attached to the ground marker represents the size of the mark in the embodiment.

FIG. 4 is a view showing an example of a case where the color of the mark 10 attached to the ground marker 100 in FIG. 1 represents the size of the mark 10 in the present embodiment. As shown in FIG. 4, in the present embodiment, for example, ground markers 111 to 113 respectively having marks 11 to 13 which are different in size, that is, a mark 11 with a large size, a mark 12 with a medium size, and a mark 13 with a small size, are used, and the marks 11 to 13 have colors corresponding to their sizes. More specifically, the mark 11 is the largest and is painted in, for example, red (hatched with a low-density dot pattern in the drawing. The same applies to the drawings described later) as a color corresponding to the size (hereinafter, the "mark 11" is referred to as the "large mark 11" for the sake of convenience). The mark 12 is the second largest and is painted in, for example, blue (hatched with a mosaic pattern in the drawing. The same applies to the drawings described later) as a color corresponding to the size (hereinafter, the "mark 12" is referred to as the "medium mark 12" for the sake of convenience). The mark 13 is the smallest and is painted in, for example, green (hatched with a high-density dot pattern in the drawing. The same applies to the drawings described later) as a color corresponding to the size (hereinafter, the "mark 13" is referred to as the "small mark 13" for the sake of convenience). Note that, in a case where at least one of the marks 11 to 13 in FIG. 4 is indicated, it is referred to as the mark 10, and in a case where at least one of the ground markers 111 to 113 is indicated, it is referred to as the ground marker 100.

The cloud server 200 according to the present embodiment analyzes the captured image aerially photographed by the drone 300, and searches for pixels of hues corresponding to the respective colors of the marks 11 to 13. In a case where the cloud server 200 can detect the pixels of the hues corresponding to the respective colors of the marks 11 to 13, the cloud server 200 determines the positions of the pixels as a candidate area where the marks (at least any one of the marks 11 to 13) may be located. Then, the cloud server 200 can output the size of the detected mark.

Furthermore, the cloud server 200 also acquires, from the drone 300, information regarding the altitude at the time of photographing. Then, the cloud server 200 sets a parameter on the basis of the size of the mark which is estimated to be included in the captured image and the altitude at the time of photographing.

Figure 5:
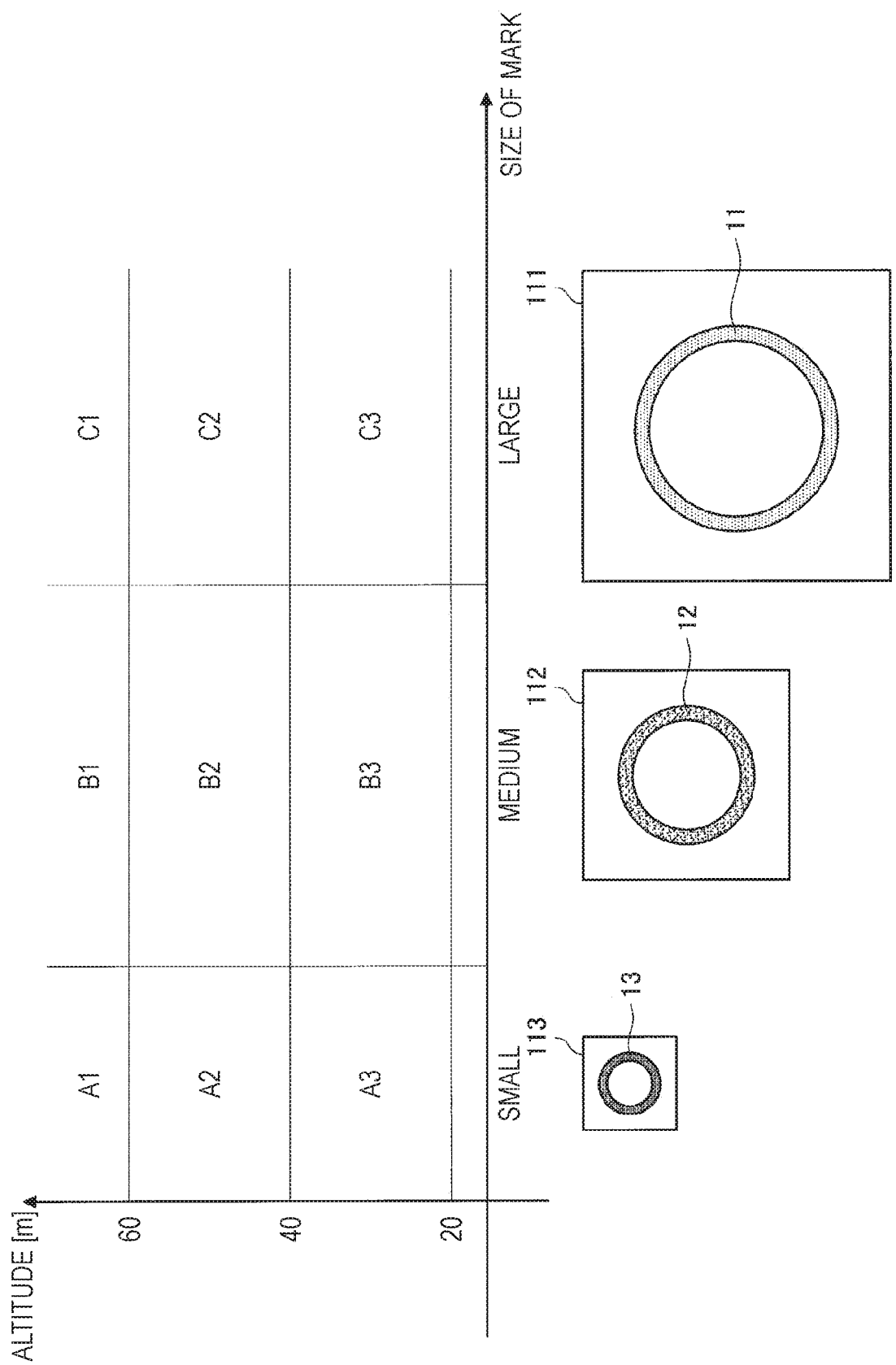
FIG. 5 is a diagram showing an example of setting a parameter based on the size of the mark and the altitude at the time of photographing in the embodiment.

Here, an example of setting a parameter will be described with reference to FIG. 5. FIG. 5 is a diagram showing an example of setting a parameter based on the size of the mark 10 and the altitude at the time of photographing. In a case where the cloud server 200 analyzes the captured image and assesses that the small mark 13 is captured, the cloud server 200 sets a parameter corresponding to the altitude at the time of photographing from among parameters A1 to A3. For example, if the altitude at the time of photographing is 50 [m], the cloud server 200 sets the parameter A2. In the similar manner to the small mark 13, the cloud server 200 sets a parameter corresponding to the altitude at the time of photographing from among parameters B1 to B3 in a case where the cloud server 200 assesses that the medium mark 12 is captured, and sets a parameter corresponding to the altitude at the time of photographing from among parameters C1 to C3 in a case where the cloud server 200 assesses that the large mark 11 is captured.

As described above, the soil volume measurement system according to the present embodiment can assess the size of the mark 10 on the basis of the color applied to the mark 10, and set a parameter suitable for the detection of the mark 10 on the basis of the size of the mark 10 and the altitude at the time of photographing. Thus, the soil volume measurement system according to the present embodiment can improve detection accuracy of the mark 10, thereby being capable of improving the accuracy in measuring a volume of soil.

Moreover, the soil volume measurement system according to the present embodiment can assess the size of the mark 10 on the basis of the color applied to the mark 10, and thus, a volume of soil can be measured by installing the ground markers 100 having marks 10 of different sizes on the ground surface in a mixed manner. Accordingly, the soil volume measurement system according to the present embodiment can use the ground marker 100 with the mark 10 of a size suitable for the location where the ground marker 100 is installed. For example, in an environment less accessible to the implementer, such as a mountainous area, the ground marker 100 having smaller mark 10 than the ground marker 100 installed in an easily accessible environment may be installed. With this process, the soil volume measurement system according to the present embodiment can reduce the burden on the implementer for installing and collecting the ground marker 100.

Furthermore, the soil volume measurement system according to the present embodiment can improve the detection accuracy of the mark 10 by using a figure having rotational symmetry, such as a circle, as the mark 10 as in the example in FIG. 4. More specifically, the cloud server 200 that analyzes the captured image may extract an area which is estimated to include the mark 10 from the captured image, obtain a correlation (correlation value, similarity) between the extracted area and a rotated image obtained by rotating the area, and assess whether or not the mark 10 is included in the area on the basis of the degree of the correlation (magnitude of the correlation value or similarity). As the correlation between the area and the rotated image is higher (as the area has a higher correlation with the rotated image), the area is identified as the ground marker 100 more easily. In a case where a figure having rotational symmetry is used as the mark 10, the soil volume measurement system according to the present embodiment can further improve the detection accuracy of the mark 10 by the process as described above.

Furthermore, the soil volume measurement system according to the present embodiment can further improve the detection accuracy of the mark 10 by painting areas, which are adjacent to the mark 10 and other than the mark 10 in the ground marker 100, in black which is a kind of achromatic color, as in the example in FIG. 4. More specifically, by painting the areas, which are adjacent to the mark 10 and which are other than the mark 10, in black, the soil volume measurement system according to the present embodiment can reduce a possibility of color mixing between the area of the mark 10 and the other areas (including the area of the installation place such as a soil area, a grassy area, or a concrete area) in the captured image, as compared to a case where such areas are painted in a color other than black. Thus, the detection accuracy of the mark 10 can be further improved.

Note that the color applied to the area other than the mark 10 is not limited to black. For example, in the soil volume measurement system according to the present embodiment, the hue corresponding to the color applied to the mark 10 and the color applied to the area which is adjacent to the mark 10 and which is other than the mark 10 differ by a predetermined threshold or more. With this configuration, the soil volume measurement system can suppress an occurrence of color mixing in a similar manner as described above, and thus, can further improve the detection accuracy of the mark 10.

Furthermore, the soil volume measurement system according to the present embodiment can further improve the detection accuracy of the mark 10 by employing the mark 10 having a hollow shape such as a circle as in the example in FIG. 4. More specifically, most of target objects except for the mark 10 appear in a shape other than a hollow shape in the captured image, and therefore, the soil volume measurement system according to the present embodiment can more easily identify the mark 10 from target objects other than the mark 10 by employing the mark 10 having a hollow shape. Thus, the soil volume measurement system according to the present embodiment can further improve the detection accuracy of the mark 10.

Note that the mark 10 described above is merely an example, and the size of the mark 10, the color corresponding to the size, the shape, and the like may be changed as appropriate. For example, marks 10 of more than (or less than) three types of size which are large, medium, and small may be prepared. Furthermore, the color applied to the mark 10 may be other than red, blue, and green. Furthermore, the mark 10 may have any shape other than a circle.

2. FUNCTIONAL CONFIGURATION OF APPARATUS (FUNCTIONAL CONFIGURATION OF CLOUD SERVER)

Figure 6:
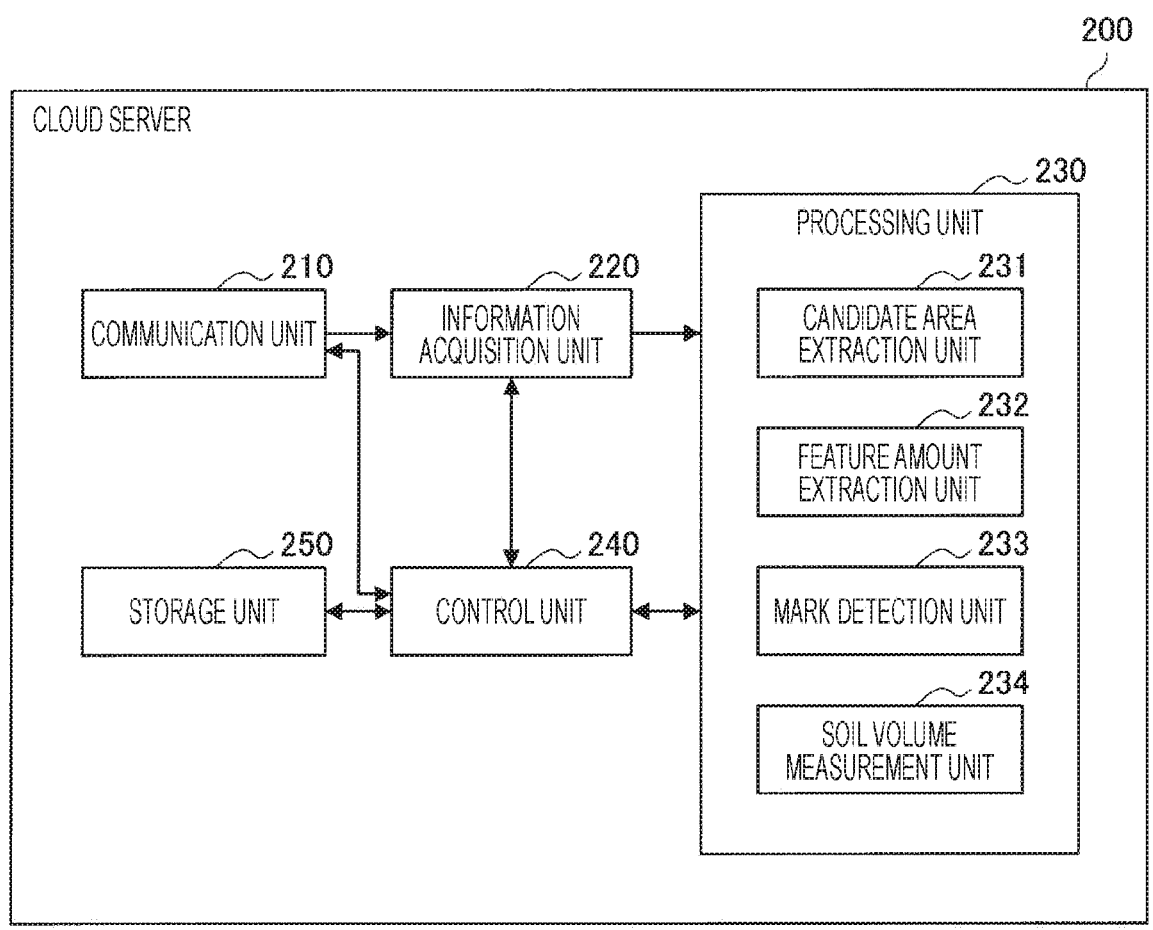
FIG. 6 is a diagram showing a functional configuration of a cloud server according to the embodiment.

The overview of the function of the soil volume measurement system according to the present embodiment has been described above. Subsequently, a functional configuration of the cloud server 200 according to the present embodiment will be described with reference to FIG. 6. FIG. 6 is a diagram showing a functional configuration of the cloud server 200 according to the present embodiment.

As shown in FIG. 6, the cloud server 200 according to the present embodiment includes a communication unit 210, an information acquisition unit 220, a processing unit 230, a control unit 240, and a storage unit 250. Furthermore, the processing unit 230 includes a candidate area extraction unit 231, a feature amount extraction unit 232, a mark detection unit 233, and a soil volume measurement unit 234.

(Communication Unit 210)

The communication unit 210 communicates with the drone 300. More specifically, the communication unit 210 receives, from the drone 300, the captured image data and information regarding the altitude at the time of photographing. Here, the information received by the communication unit 210 from the drone 300 may appropriately include information other than the captured image data and the information regarding the altitude at the time of photographing. The communication unit 210 provides various types of information received from the drone 300 to the information acquisition unit 220.

Here, any communication system may be used for communication between the communication unit 210 and the drone 300. For example, the communication unit 210 and the drone 300 may communicate via a public network such as the Internet, a telephone network, or a satellite communication network, various types of local area networks (LANs) including Ethernet (registered trademark), wide area networks (WAN), or the like. Furthermore, the communication unit 210 and the drone 300 may communicate via a dedicated line network such as internet protocol-virtual private network (IP-VPN) or a near-field wireless communication network such as Bluetooth (registered trademark).

Note that, although it is assumed in the present specification that the communication unit 210 performs wireless communication with the drone 300, the communication unit 210 may perform wired communication with the drone 300. For example, the implementer may collect the drone 300 after aerial photographing, and connect the drone 300 to the cloud server 200 with a cable, in order that the captured image data or the like is transmitted and received between the drone 300 and the communication unit 210 in the cloud server 200.

(Information Acquisition Unit 220)

The information acquisition unit 220 functions as an acquisition unit that acquires various types of information used for measuring a volume of soil. More specifically, the information acquisition unit 220 acquires various types of information including the captured image data and the information regarding the altitude at the time of photographing from the communication unit 210, and provides the acquired information to the processing unit 230. Note that the information acquisition unit 220 may edit the acquired information as appropriate. For example, the information acquisition unit 220 may delete information unnecessary for measuring the volume of soil from the acquired information, or may reduce the data amount of the captured image data. In other words, the information acquisition unit 220 may delete unnecessary images from among images at takeoff and landing, overlapping images while turning, and overlapping images at altitude adjustment, which are acquired in a case where images are captured before and after flight of the drone 300. Furthermore, a plurality of acquired captured images may be stored with the overlapping areas being removed.

(Processing Unit 230)

The processing unit 230 has a function as a detection unit for detecting the feature (color in the present embodiment) of the target object in the captured image, a function as a determination unit for determining various parameters used for a process for assessing whether or not the target object is the mark 10 on the basis of the feature that has been detected, and a function as an assessment unit for assessing whether or not the target object is the mark 10. Furthermore, the processing unit 230 performs a soil volume measurement process on the basis of the mark 10 that has been detected from the captured image using these functions. As described above, the processing unit 230 includes the candidate area extraction unit 231, the feature amount extraction unit 232, the mark detection unit 233, and the soil volume measurement unit 234, and the process is shared by these configurations.

(Candidate Area Extraction Unit 231)

The candidate area extraction unit 231 extracts a candidate area that is a candidate for an area where the mark 10 (or the ground marker 100) is included in the captured image. More specifically, the candidate area extraction unit 231 extracts the candidate area that is a candidate for an area where the mark 10 is included, by performing, on the captured image data provided by the information acquisition unit 220, a binarization process for binarizing pixels of the captured image, an erosion process, a dilation process, an edge detection process for detecting an edge of a pixel estimated to be the mark 10, and an extraction process for extracting a rectangle circumscribing the edge. The candidate area extraction unit 231 provides information regarding the extracted candidate area to the feature amount extraction unit 232. The details of each process will be described later.

(Feature Amount Extraction Unit 232)

The feature amount extraction unit 232 extracts the feature amount of the candidate area. For example, the feature amount extraction unit 232 can extract feature amounts of candidate areas as described below.

For example, the candidate area extraction unit 231 can obtain, as the feature amount of the candidate area, a ratio (hereinafter referred to as a "size ratio" for convenience) between the size of the candidate area and an estimated value of the size of the mark 10 in a case where the mark 10 is included in the captured image.

Here, the captured image is recorded in a file in, for example, an exchangeable image file format (EXIF). In the EXIF file, a date and time at which an image is captured, a focal length, global positioning system (GPS) information such as the latitude, longitude, and altitude (elevation) of the position where the image is captured, and the like are recorded as photograph metadata.

The feature amount extraction unit 232 estimates the size of the mark 10 included in the captured image on the basis of, for example, the altitude and the focal length of the photographing position recorded in the EXIF file.

The feature amount extraction unit 232 can easily assess that the candidate area that is too large or too small does not include the mark 10 by using the size ratio. For example, as the size ratio is closer to 1.0, the possibility that the candidate area is assessed to include the mark 10 increases.

Furthermore, the feature amount extraction unit 232 can obtain, for example, an aspect ratio of the candidate area as the feature amount of the candidate area. The feature amount extraction unit 232 can easily assess that a candidate area having a different (horizontal to vertical) ratio from the horizontal to vertical ratio of the mark 10 does not include the mark 10 by using the aspect ratio of the candidate area. For example, as the aspect ratio of the candidate area is closer to 1.0, the possibility that the candidate area is assessed to include the mark 10 increases.

Furthermore, the feature amount extraction unit 232 can obtain, for example, the correlation (correlation value, similarity) between the candidate area and a template image of the mark 10 as the feature amount of the candidate area. For example, as the correlation value between the candidate area and the template image is greater than a predetermined threshold (as the candidate area has a higher correlation with the template image), the feature amount extraction unit 232 can more easily assess that the candidate area includes the mark 10. Note that the template image of the mark 10 is prepared in advance. Furthermore, any method can be used as the method for calculating the correlation value.

Furthermore, the feature amount extraction unit 232 can obtain, for example, a correlation between the candidate area and a rotated image obtained by rotating the candidate area as the feature amount of the candidate area. For example, as the correlation value between the candidate area and the rotated image is greater, the feature amount extraction unit 232 can more easily assess that the candidate area includes the mark 10. In a case where the mark has rotational symmetry as in the mark 10 in the present embodiment, the feature amount extraction unit 232 can improve the detection accuracy of the mark 10 by obtaining the correlation between the candidate area and the rotated image obtained by rotating the candidate area. Note that the candidate area is rotated by a predetermined angle other than an integral multiple of $2\pi$.

Furthermore, the feature amount extraction unit 232 can apply, for example, a filter (function) that emphasizes the color applied to the mark 10 to the candidate area and the template image, and obtain the correlation between the candidate area after the application of the filter and the template image after the application of the filter, as the feature amount of the candidate area. For example, as the correlation value between the candidate area after the application of the filter and the template image after the application of the filter is greater, the feature amount extraction unit 232 can more easily assess that the candidate area includes the mark 10.

Note that the feature amount of the candidate area extracted by the feature amount extraction unit 232 is not limited to the feature amount mentioned above. The feature amount extraction unit 232 provides information regarding the extracted feature amount to the mark detection unit 233.

(Mark Detection Unit 233)

The mark detection unit 233 performs a process for detecting the mark 10. More specifically, the mark detection unit 233 assesses whether or not the candidate area includes the mark 10 on the basis of the information regarding the feature amount of the candidate area provided from the feature amount extraction unit 232. Then, the mark detection unit 233 provides information regarding the mark 10 detected by the assessment to the soil volume measurement unit 234.

Note that any method may be used to assess whether or not the candidate area includes the mark 10. For example, the mark detection unit 233 may perform a threshold process on each feature amount of the candidate area, and assess whether or not the candidate area includes the mark 10 by majority decision of the result of the threshold process, weighted addition of points representing the result of the threshold process, or the like. Furthermore, the mark detection unit 233 may input each feature amount of the candidate area to a classifier (not shown) configured with a neural network or the like that has previously performed learning, and assess whether or not the candidate area includes the mark 10 on the basis of the output of the classifier in response to the input.

(Soil Volume Measurement Unit 234)

The soil volume measurement unit 234 creates a three-dimensional model of the ground and performs a soil volume measurement process. More specifically, the soil volume measurement unit 234 creates the three-dimensional model of the ground by associating the position of each mark 10 detected by the mark detection unit 233 with information such as the latitude, longitude, and elevation of each mark 10 separately measured, and measures the volume of soil using the created three-dimensional model.

3. OPERATION OF APPARATUS

The functional configuration of the cloud server 200 according to the present embodiment has been described above. Subsequently, the operation of each apparatus according to the present embodiment will be described.

(3-1. Soil Volume Measurement)

Figure 7:
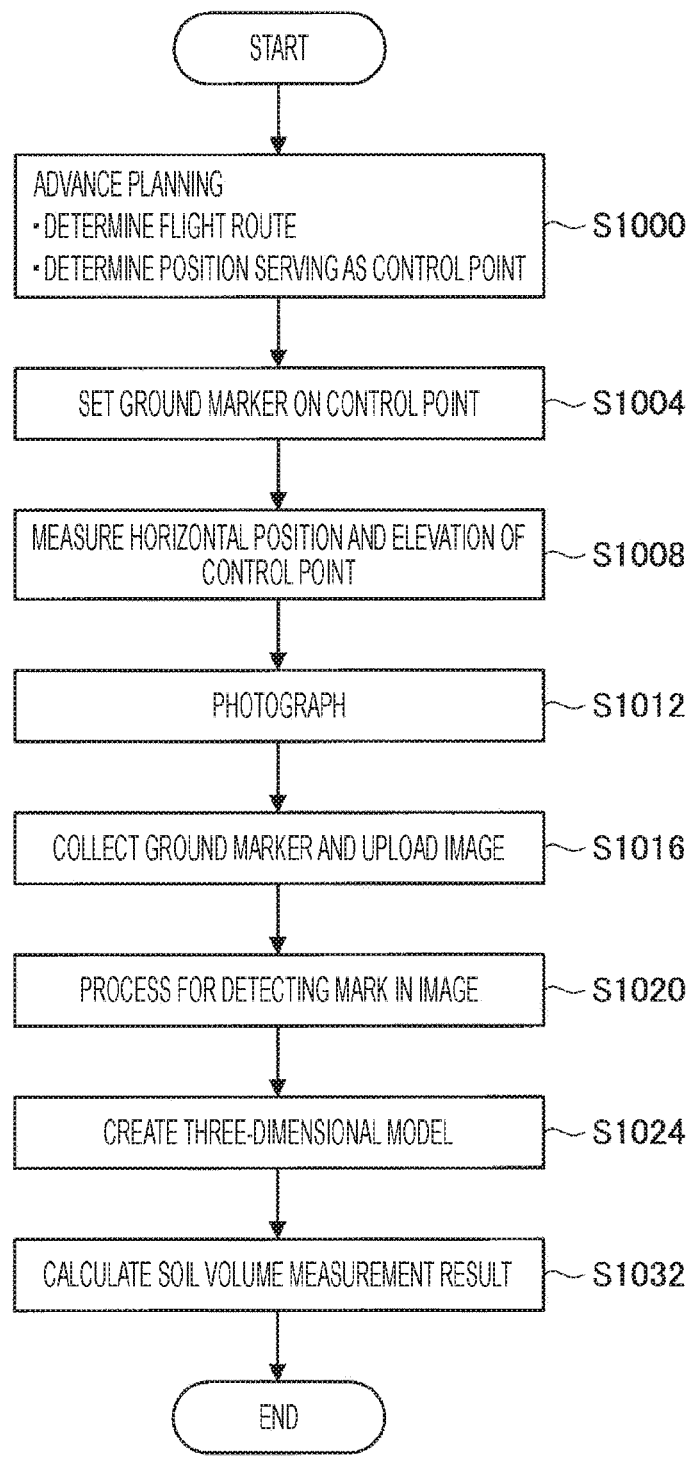
FIG. 7 is a flowchart showing an example of a work flow of soil volume measurement performed by the soil volume measurement system according to the embodiment.

First, the operation of each apparatus for measuring the volume of soil will be described with reference to FIG. 7. FIG. 7 is a flowchart showing an example of a work flow of soil volume measurement performed by the soil volume measurement system according to the present embodiment.

In step S1000, an advance planning of soil volume measurement is created by the implementer performing the soil volume measurement. In the advance planning, the flight route of the drone 300 is determined, and the position of the control point where the ground marker 100 is installed is determined, for example.

In step S1004, the ground markers 100 are installed at the control points set at intervals of, for example, several hundred [m] according to the advance planning. The ground markers 100 may be installed manually or using a robot or the like which is movable, or may be installed by being thrown from the sky by the drone 300, for example. Note that, in the present embodiment, a plurality of types of ground markers 100 with marks 10 having different sizes may be installed in a mixed manner.

In step S1008, the horizontal position (latitude and longitude) and the elevation of each control point on which the ground marker 100 is installed are measured. In step S1012, the drone 300 flies in accordance with the advance planning, and aerially photographs (or the photographing device mounted on the drone 300 aerially photographs) the ground surface including the mark 10. By the aerial photographing performed in step S1012, a plurality of images is captured such that the respective captured images partly overlap each other. Then, the aerial photographing is performed so that a part or entire of the range in which the ground marker 100 is installed is captured.

In step S1016, the ground markers 100 installed on the ground are collected by the implementer or the like, and the captured image data is uploaded (sent) to the cloud server 200. Thereafter, the cloud server 200 combines the plurality of captured images on the basis of overlapping portions or the like of the captured images. In step S1020, the cloud server 200 performs a detection process for detecting the mark 10 included in the combined captured image from the combined captured image. The detail of the operation flow of the detection process will be described later.

In step S1024, the cloud server 200 creates a three-dimensional model of the ground using the horizontal position and the elevation of each control point measured in step S1008 and the detection result of the mark 10 obtained in the detection process performed in step S1020. Then, in step S1032, the cloud server 200 measures the volume of soil using the three-dimensional model of the ground, and outputs the measurement result. Thus, the process ends.

(3-2. Process for Detecting Mark)

Figure 8:
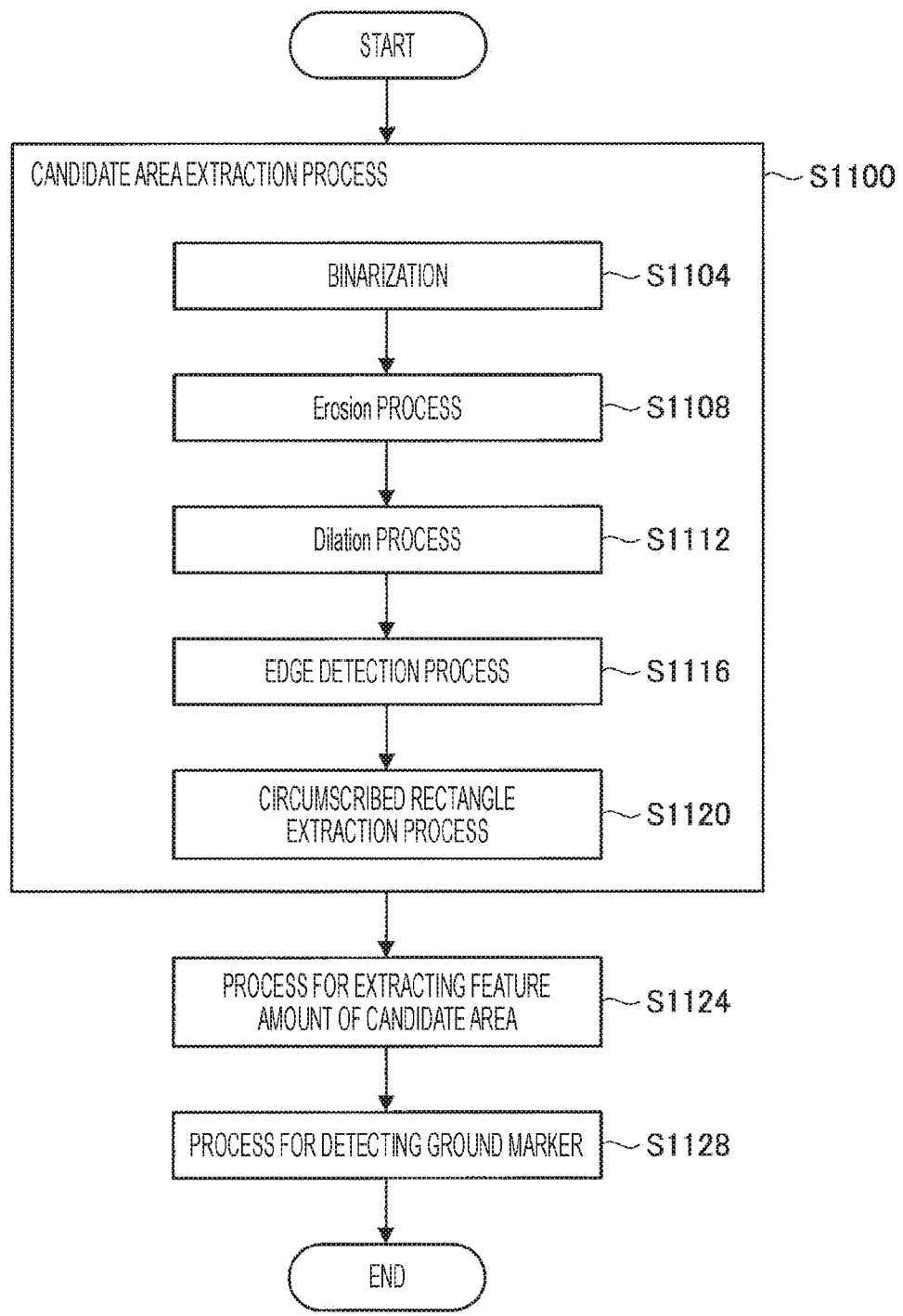
FIG. 8 is a flowchart showing an example of a flow of a process for detecting a mark performed by the soil volume measurement system according to the embodiment.

Subsequently, the detail of the "process for detecting mark in image" in step S1020 in FIG. 7 will be described with reference to FIG. 8. FIG. 8 is a flowchart showing an example of a flow of the process for detecting the mark 10 performed by the soil volume measurement system according to the present embodiment.

First, in step S1100, the candidate area extraction unit 231 of the cloud server 200 performs a candidate area extraction process (steps S1104 to S1120) for extracting a candidate area from the captured image. In step S1104, the candidate area extraction unit 231 binarizes (the pixel value of) each pixel of the captured image depending on whether it is a pixel of each color applied to the mark 10 or a pixel other than the color.

For example, the candidate area extraction unit 231 uses the hue H (Hue) in the HSV space corresponding to red applied to the large mark 11 shown in FIG. 4, assesses the pixel of the hue H within a range that can be regarded as the hue H of the red color (for example, a pixel in the range of 320 degrees to 360 degrees) as the pixel of the color applied to the large mark 11, and sets the pixel value to 0 or 1 (1, for example). Furthermore, the candidate area extraction unit 231 assesses pixels (pixels that are not assessed to be the pixel of red applied to the large mark 11) other than the pixel of the hue H within the range of 320 degrees to 360 degrees as pixels that are not the pixel of red applied to the large mark 11, and sets the pixel values thereof to, for example, 0 which is one of 0 and 1. The candidate area extraction unit 231 performs a binarization process for detecting blue applied to the medium mark 12 and green applied to the small mark 13 as in the above-described process.

Note that, for the binarization of pixels of the captured image, saturation S (Saturation) or brightness V (Value) may be used in addition to the hue H in the HSV space. For example, in a case where the color applied to the mark 10 is red, the candidate area extraction unit 231 may assess a pixel in which the hue H in the HSV space is within a range of 320 degrees to 360 degrees and the saturation S is within a range of 30 to 255 as the pixel of the color applied to the mark 10. Alternatively, the candidate area extraction unit 231 may assess a pixel in which the hue H in the HSV space is within a range of 320 degrees to 360 degrees, the saturation S is within a range of 30 to 255, and the brightness V is within a range of 50 to 255 as the pixel of the color applied to the mark 10. As described above, the candidate area extraction unit 231 can perform binarization for extracting the candidate area using at least the hue H from among the hue H, the saturation S, and the brightness V of the color applied to the mark 10.

Furthermore, the candidate area extraction unit 231 can extract a more probable candidate area as the area where the mark 10 is included by performing binarization for extracting the candidate area using at least the hue H from among the hue H, the saturation S, and the brightness V of the color applied to the mark 10.

In step S1108, the candidate area extraction unit 231 performs an erosion process on the binarized image obtained by binarization of the captured image. In step S1112, the candidate area extraction unit 231 performs a dilation process on the binarized image after the erosion process. The candidate area extraction unit 231 can remove noise from the binarized image by the erosion process and the dilation process.

In step S1116, the candidate area extraction unit 231 performs the edge detection process for detecting an area of a pixel having a pixel value of 1 in the binarized image after the dilation process, that is, the edge of the pixel which is estimated to be the mark 10 in the captured image.

In step S1120, the candidate area extraction unit 231 extracts an area corresponding to a rectangle circumscribing the edge detected by the edge detection process as a candidate area including the mark 10, and provides information regarding the extracted candidate area to the feature amount extraction unit 232. Note that, in a case where there is a plurality of edges detected by the edge detection process, a candidate area is extracted for each of the plurality of edges.

In step S1124, the feature amount extraction unit 232 performs a feature amount extraction process for extracting the feature amount of the candidate area, and provides the feature amount of the candidate area obtained by the feature amount extraction process to the mark detection unit 233.

In step S1128, the mark detection unit 233 detects the mark 10 by assessing whether or not the mark 10 is included in the candidate area on the basis of the feature amount of each candidate area, and outputs the detection result.

4. MODIFICATION

The detail of the process for detecting the mark 10 has been described above. Subsequently, modifications of the present disclosure will be described. In the above embodiment, the color of the mark 10 represents the size of the mark 10. In the following modifications, the size of the mark 10 is represented by features other than the color of the mark 10.

(4-1. First Modification)

Figure 9:
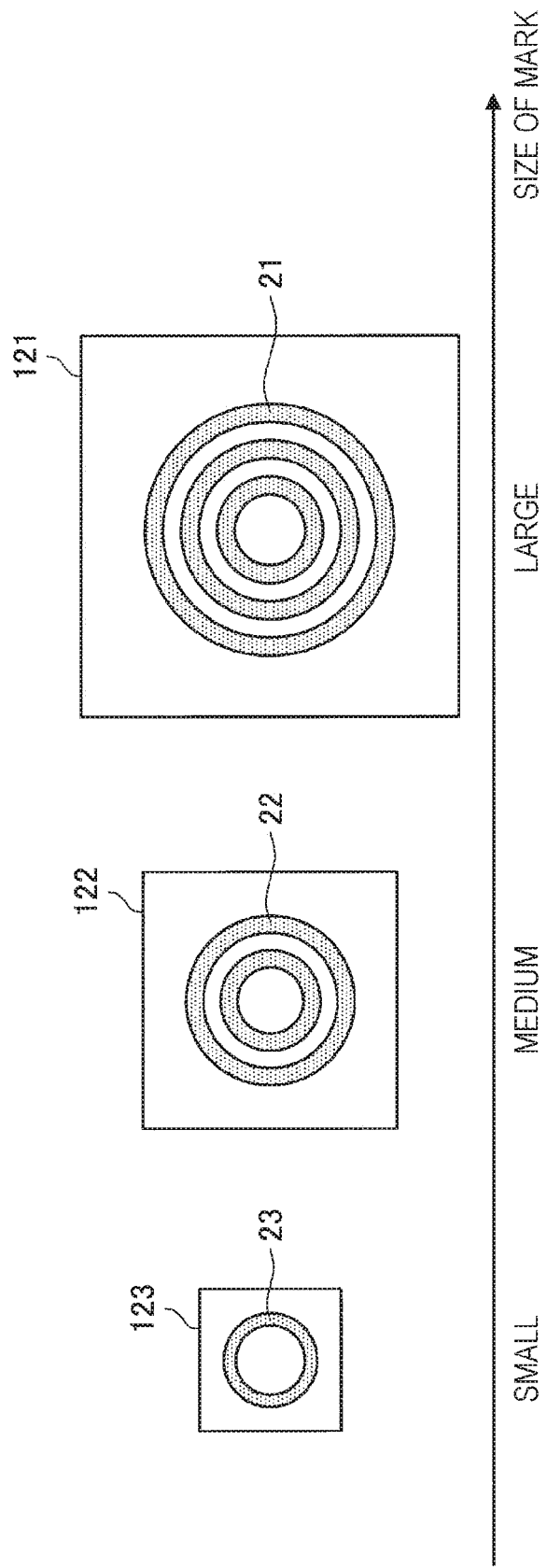
FIG. 9 is a view showing an example of a case where the shape of a mark represents the size of the mark in a first modification.

First, a first modification will be described. The first modification indicates a case where the size of the mark 10 is represented by the shape of the mark 10. Here, the first modification will be described with reference to FIG. 9. FIG. 9 is a view showing an example of a case where the shape of the mark 10 represents the size of the mark 10 in the first modification.

For example, in the first modification, ground markers 121 to 123 having marks 21 to 23 which are different in size, that is, respectively having a mark 21 with a large size, a mark 22 with a medium size, and a mark 23 with a small size, are used, and the marks 21 to 23 have shapes corresponding to their sizes, as shown in FIG. 9. More specifically, the mark 21 is the largest and has, as the shape corresponding to its size, a shape in which three circles having different radii and having a predetermined width are concentrically arranged (hereinafter, the "mark 21" may be referred to as the "large mark 21" for convenience).

Furthermore, the mark 22 is the second largest and has, as the shape corresponding to its size, a shape in which two circles having different radii and having a predetermined width are concentrically arranged (hereinafter, the "mark 22" may be referred to as the "medium mark 22" for convenience). Finally, the mark 23 is the smallest and has, as the shape corresponding to its size, a shape in which one circle having a predetermined width is arranged (hereinafter, the "mark 23" may be referred to as the "small mark 23" for convenience).

The cloud server 200 according to the first modification analyzes the captured image captured by the drone 300, and searches for the shapes of the marks 21 to 23 in the captured image. Here, a method similar to the method in the above embodiment may be used for searching. In a case where the cloud server 200 can detect the shapes of the marks 21 to 23, the cloud server 200 sets the position where the shapes can be detected as a candidate area where the marks (at least any of the marks 21 to 23) may be located. Then, the cloud server 200 can output the size of the detected mark.

Then, as in the above embodiment, the cloud server 200 acquires, from the drone 300, information regarding the altitude at the time of photographing. Then, the cloud server 200 sets a parameter on the basis of the size of the mark which is estimated to be included in the captured image and the altitude at the time of photographing. The method for setting a parameter is similar to the method described with reference to FIG. 5, so that the description thereof will be omitted.

Note that, since the marks 21 to 23 shown in FIG. 9 also have rotational symmetry like the marks 11 to 13 shown in FIG. 4, the feature amount extraction unit 232 can improve the detection accuracy of the marks 21 to 23 by obtaining a correlation between the candidate area and a rotated image obtained by rotating the candidate area in the feature amount extraction process.

Furthermore, similarly to the marks 11 to 13 shown in FIG. 4, black which is a kind of achromatic color is applied to portions between the plurality of circles of the marks 21 to 23 shown in FIG. 9. As a result, the soil volume measurement system according to the first modification can also reduce a possibility of color mixing between the areas of the marks 21 to 23 and the other areas (including the area of the installation place such as a soil area, a grassy area, or a concrete area) in the captured image, and thus, can further improve the detection accuracy of the marks 21 to 23. Note that, as in the above embodiment, the color applied to the areas other than the marks 21 to 23 is not limited to black.

Furthermore, the marks 21 to 23 shown in FIG. 9 also have hollow shapes, like the marks 11 to 13 shown in FIG. 4. Thus, the soil volume measurement system according to the first modification can also more easily identify the marks 21 to 23 from target objects other than the marks 21 to 23, thereby being capable of further improving the detection accuracy of the marks 21 to 23.

Note that the marks 21 to 23 shown in FIG. 9 are merely examples, and the size of each mark and the shape, color, or the like corresponding to the size may be changed as appropriate. For example, marks of more than (or less than) three types of size which are large, medium, and small may be prepared. Furthermore, the shape of each mark may be a polygon or the like.

(4-2. Second Modification)

Figure 10:
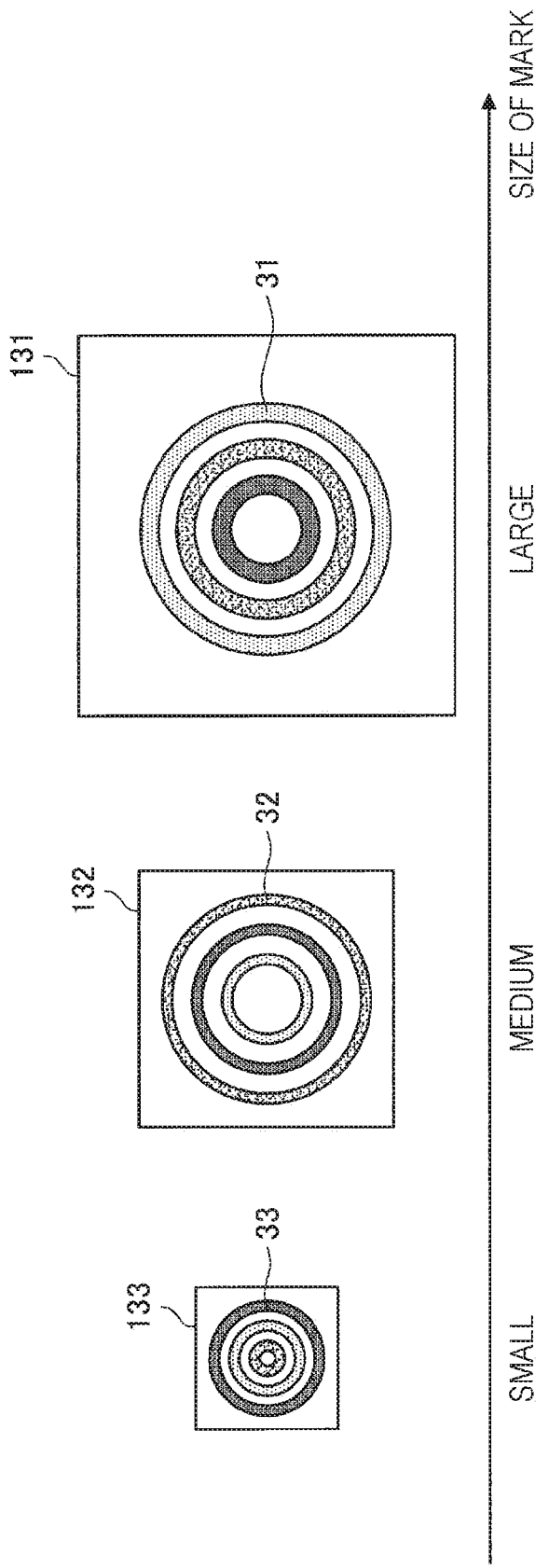
FIG. 10 is a view showing an example of a case where the order of colors applied to a mark represents the size of the mark in a second modification.

Subsequently, a second modification will be described. The second modification indicates the case where the size of the mark 10 is represented by a color arrangement of the mark 10 (for example, the order of the colors applied to the mark 10). Here, the second modification will be described with reference to FIG. 10. FIG. 10 is a view showing an example where the order of colors applied to the mark 10 represents the size of the mark 10 in the second modification.

For example, in the second modification, ground markers 131 to 133 having marks 31 to 33 which are different in size, that is, respectively having a mark 31 with a large size, a mark 32 with a medium size, and a mark 33 with a small size, are used, as shown in FIG. 10. Each of the marks 31 to 33 has a shape in which three circles having different radii and a predetermined width are arranged concentrically.

Then, the marks 31 to 33 are respectively colored in the order corresponding to their sizes. More specifically, the mark 31 is the largest, and is colored in red, blue, and green in order from the outer circle as the color arrangement corresponding to its size (hereinafter, the "mark 31" is referred to as the "large mark 31" for convenience).

Furthermore, the mark 32 is the second largest, and is colored in blue, green, and red in order from the outer circle as the color arrangement corresponding to its size (hereinafter, the "mark 32" is referred to as the "medium mark 32" for convenience). Finally, the mark 33 is the smallest, and is colored in green, red, and blue in order from the outer circle as the color arrangement corresponding to its size (hereinafter, the "mark 33" is referred to as the "small mark 33" for convenience).

The cloud server 200 according to the second modification analyzes the captured image captured by the drone 300, and searches for the color arrangement of the marks 31 to 33 in the captured image. Here, a method similar to the method in the above embodiment may be used for searching. In a case where the cloud server 200 can detect the color arrangements of the marks 31 to 33, the cloud server 200 sets the position where the color arrangements can be detected as a candidate area where the marks (at least any of the marks 31 to 33) may be located. Then, the cloud server 200 can output the size of the detected mark.

Then, as in the above embodiment, the cloud server 200 acquires, from the drone 300, information regarding the altitude at the time of photographing. Then, the cloud server 200 sets a parameter on the basis of the size of the mark which is estimated to be included in the captured image and the altitude at the time of photographing. The method for setting a parameter is similar to the method described with reference to FIG. 5, so that the description thereof will be omitted.

Note that, since the marks 31 to 33 shown in FIG. 10 also have rotational symmetry like the marks 11 to 13 shown in FIG. 4, the feature amount extraction unit 232 can improve the detection accuracy of the marks 31 to 33 by obtaining a correlation between the candidate area and a rotated image obtained by rotating the candidate area in the feature amount extraction process.

Furthermore, similarly to the marks 11 to 13 shown in FIG. 4, black which is a kind of achromatic color is applied to portions between the plurality of circles of the marks 31 to 33 shown in FIG. 10. As a result, the soil volume measurement system according to the second modification can also reduce a possibility of color mixing between the areas of the marks 31 to 33 and the other areas (including the area of the installation place such as a soil area, a grassy area, or a concrete area) in the captured image, and thus, can further improve the detection accuracy of the marks 31 to 33. Note that, as in the above embodiment, the color applied to the areas other than the marks 31 to 33 is not limited to black.

Furthermore, the marks 31 to 33 shown in FIG. 10 also have hollow shapes, like the marks 11 to 13 shown in FIG. 4. Thus, the soil volume measurement system according to the second modification can also more easily identify the marks 31 to 33 from target objects other than the marks 31 to 33, thereby being capable of further improving the detection accuracy of the marks 31 to 33.

Note that the marks 31 to 33 shown in FIG. 10 are merely examples, and the size of each mark and the color arrangement, shape, or the like corresponding to the size may be changed as appropriate. For example, marks of more than (or less than) three types of size which are large, medium, and small may be prepared. Furthermore, the shape of each mark may be a polygon or the like.

5. PARAMETER SETTING METHOD

Figure 11:
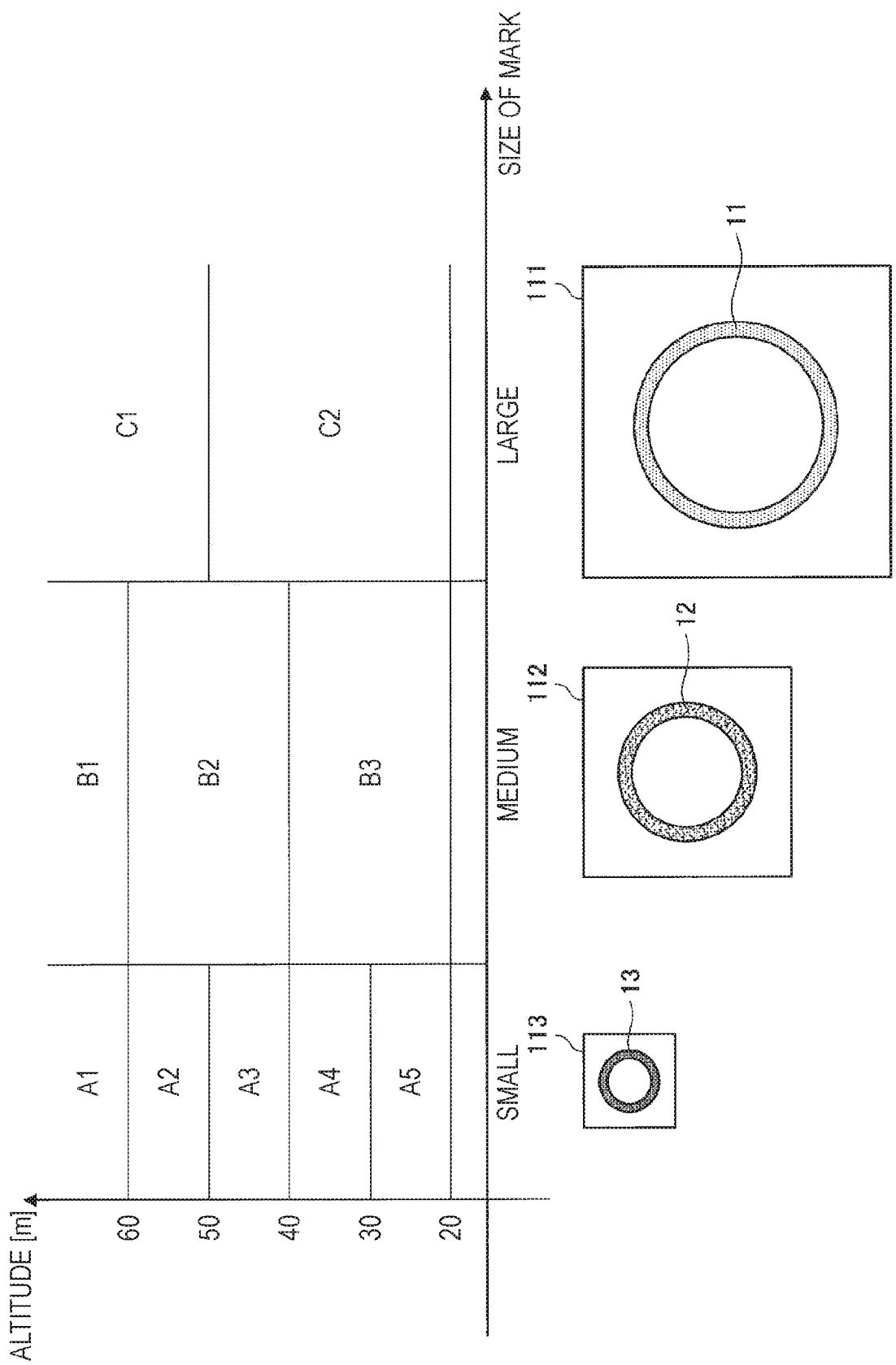
FIG. 11 is a diagram showing an example of a variation of a parameter setting method.
Figure 12:
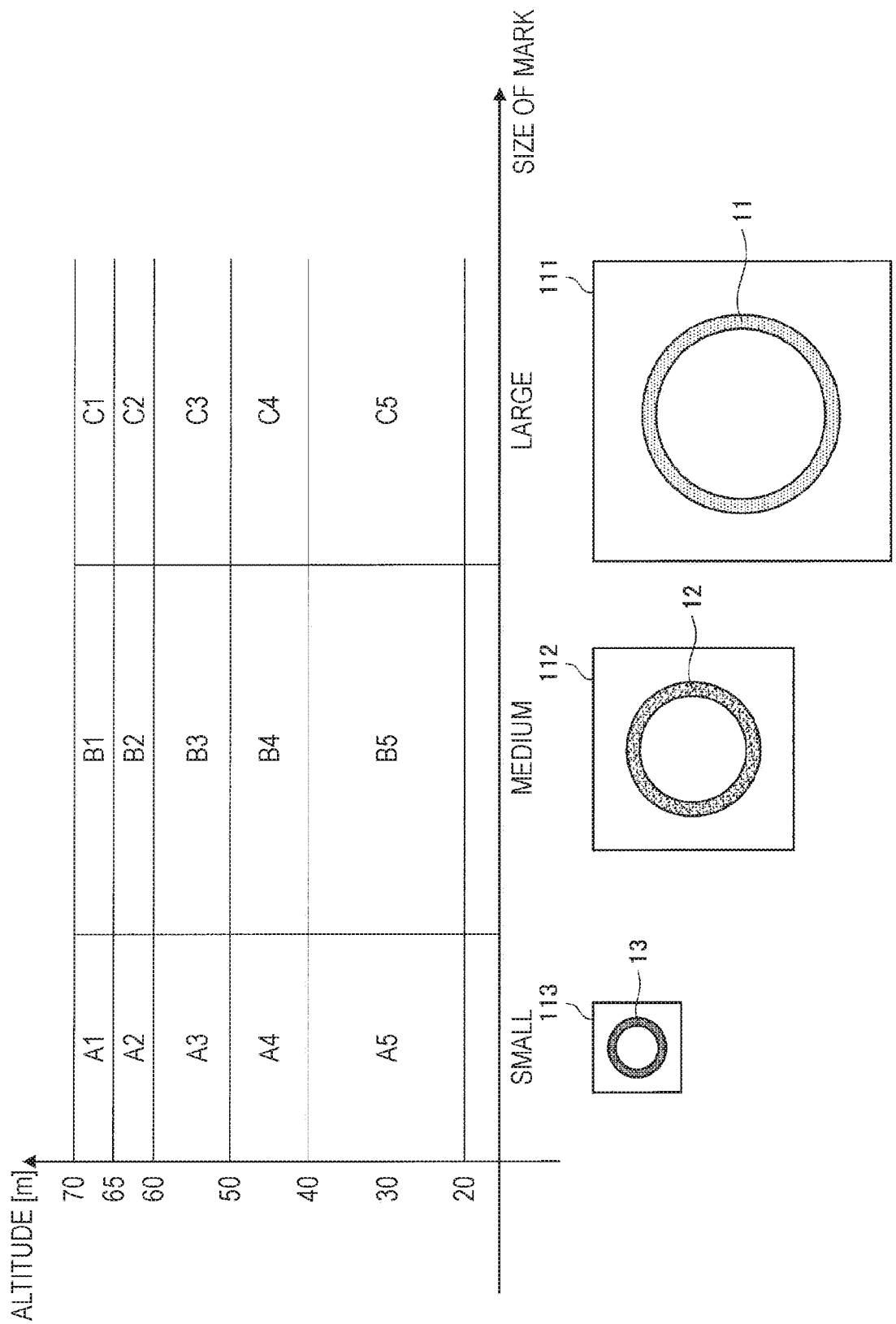
FIG. 12 is a diagram showing an example of a variation of the parameter setting method.
Figure 13:
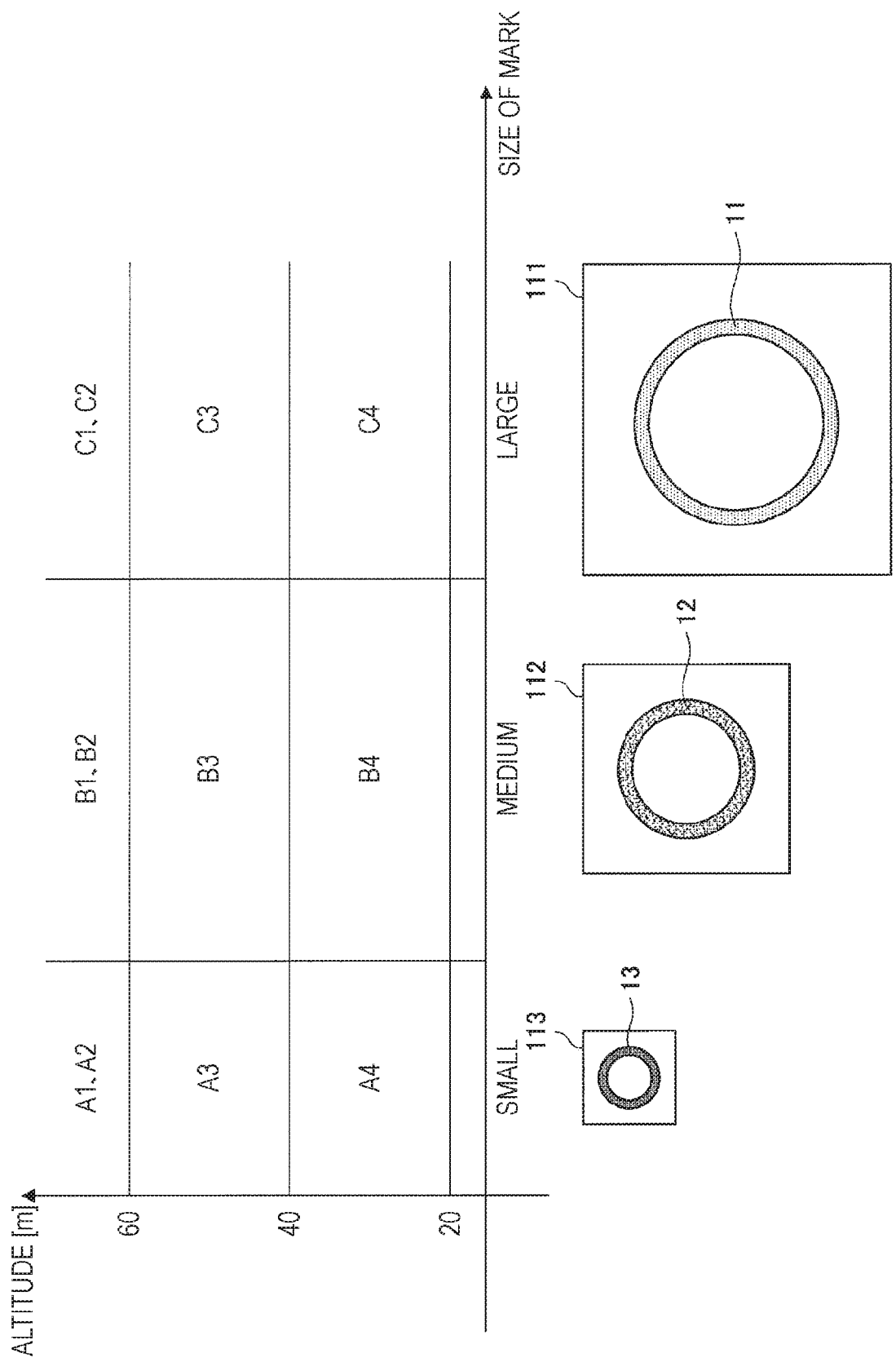
FIG. 13 is a diagram showing an example of a variation of the parameter setting method.

The second modification of the present disclosure has been described above. Subsequently, variations of the parameter setting method will be described with reference to FIGS. 11 to 13. FIGS. 11 to 13 are diagrams showing examples of variations of the parameter setting method. In the example in FIG. 5 described above, the altitudes (thresholds) at which the parameter is changed are the same among the marks 11 to 13. For example, the parameter is changed at the altitudes of 20 [m], 40 [m], and 60 [m] for any of the marks 11 to 13.

Here, the parameter setting method is not limited to the method in FIG. 5. For example, as shown in FIG. 11, the altitudes (thresholds) at which the parameter is changed may be different according to the size of each mark. For example, as in the example in FIG. 11, the parameter used to detect the small mark 13 may be changed at 20 [m], 30 [m], 40 [m], 50 [m], and 60 [m], the parameter used to detect the medium mark 12 may be changed at 20 [m], 40 [m], and 60 [m], and the parameter used to detect the large mark 11 may be changed at 20 [m] and 50 [m].

Thus, the soil volume measurement system according to the present embodiment can improve the detection accuracy of each mark. More specifically, the soil volume measurement system according to the present embodiment more finely changes the parameter used to detect the mark which is less easily detected (for example, the small mark 13), and thus, can improve the detection accuracy of the mark. On the other hand, since it is considered that the detection accuracy is not greatly reduced even when the parameter used to detect the mark which is easily detected (for example, the large mark 11) is not finely changed, the soil volume measurement system according to the present embodiment does not finely change the parameter used to detect the mark which is easily detected. Thus, the soil volume measurement system can eliminate a parameter changing process. Note that the description that the small mark 13 is less easily detected and the large mark 11 is easily detected is merely an example, and ease of detection of each mark may vary depending on various factors such as the shape or color of the mark and the performance of the analysis program.

Furthermore, the intervals of altitudes (thresholds) at which the parameter is changed may not be uniform. For example, as shown in FIG. 12, the altitudes (thresholds) at which the parameter is changed may be set such that the intervals between the altitudes (thresholds) at which the parameter is changed may be decreased with an increase in altitude, such as at 20 [m], 40 [m], 50 [m], 60 [m], 65 [m], and 70 [m].

Note that this is merely an example, and the altitudes (thresholds) at which the parameter is changed and the intervals thereof may be changed as appropriate.

Thus, the soil volume measurement system according to the present embodiment can improve the detection accuracy of each mark. More specifically, the soil volume measurement system according to the present embodiment more finely changes the parameter used for an analysis of the captured image captured at an altitude at which the mark is less easily detected (for example, at higher altitude), and thus, can improve the detection accuracy of the mark. On the other hand, since it is considered that the detection accuracy is not greatly reduced even when the parameter used for an analysis of the captured image captured at an altitude at which the mark is easily detected (for example, at a lower altitude) is not finely changed, the soil volume measurement system according to the present embodiment does not finely change the parameter used for an analysis of the captured image captured at an altitude at which the mark is easily detected. Thus, the soil volume measurement system can eliminate the parameter changing process. Note that the description that the mark is less easily detected from a captured image captured at a higher altitude and the mark is easily detected from a captured image captured at a lower altitude is merely an example, and ease of detection of each mark may vary depending on various factors such as the shape or color of the mark and the performance of the analysis program.

Furthermore, a process for detecting the mark using a plurality of parameters may be performed. For example, as shown in FIG. 13, a plurality of parameters, such as A1 and A2 for the small mark 13, B1 and B2 for the medium mark 12, and C1 and C2 for the large mark 11, may be used for the analysis of the captured image captured at an altitude higher than or equal to 60 [m]. More specifically, the soil volume measurement system according to the present embodiment first sets any one of a plurality of parameters for detection of a mark, and thereafter (or simultaneously), sets other parameters for the detection of the mark. Then, the soil volume measurement system according to the present embodiment determines that the detection result in which more marks are detected is right, or determines that the detection result which can be assessed to be highly accurate in some way such as merging the detection results obtained by the respective parameters is right.

Thus, the soil volume measurement system according to the present embodiment can improve the detection accuracy of each mark. More specifically, the soil volume measurement system according to the present embodiment analyzes the captured image captured at an altitude at which the mark is less easily detected (for example, at higher altitude) using a plurality of parameters, and thus, can improve the detection accuracy of the mark. On the other hand, a single parameter may be used for the analysis of the captured image captured at an altitude at which the mark is easily detected (for example, lower altitude), as in the above embodiment. Note that the description that the mark is less easily detected from a captured image captured at a higher altitude and the mark is easily detected from a captured image captured at a lower altitude is merely an example, and ease of detection of each mark may vary depending on various factors such as the shape or color of the mark and the performance of the analysis program. Furthermore, although not shown, a plurality of parameters may be used for the process for detecting a mark (for example, the small mark 13) which is less easily detected.

6. HARDWARE CONFIGURATION OF CLOUD SERVER

The embodiments of the present disclosure have been described above. Information processing such as the process for detecting the mark 10 described above is achieved by cooperation of software and hardware of the cloud server 200 described below.

Figure 14:
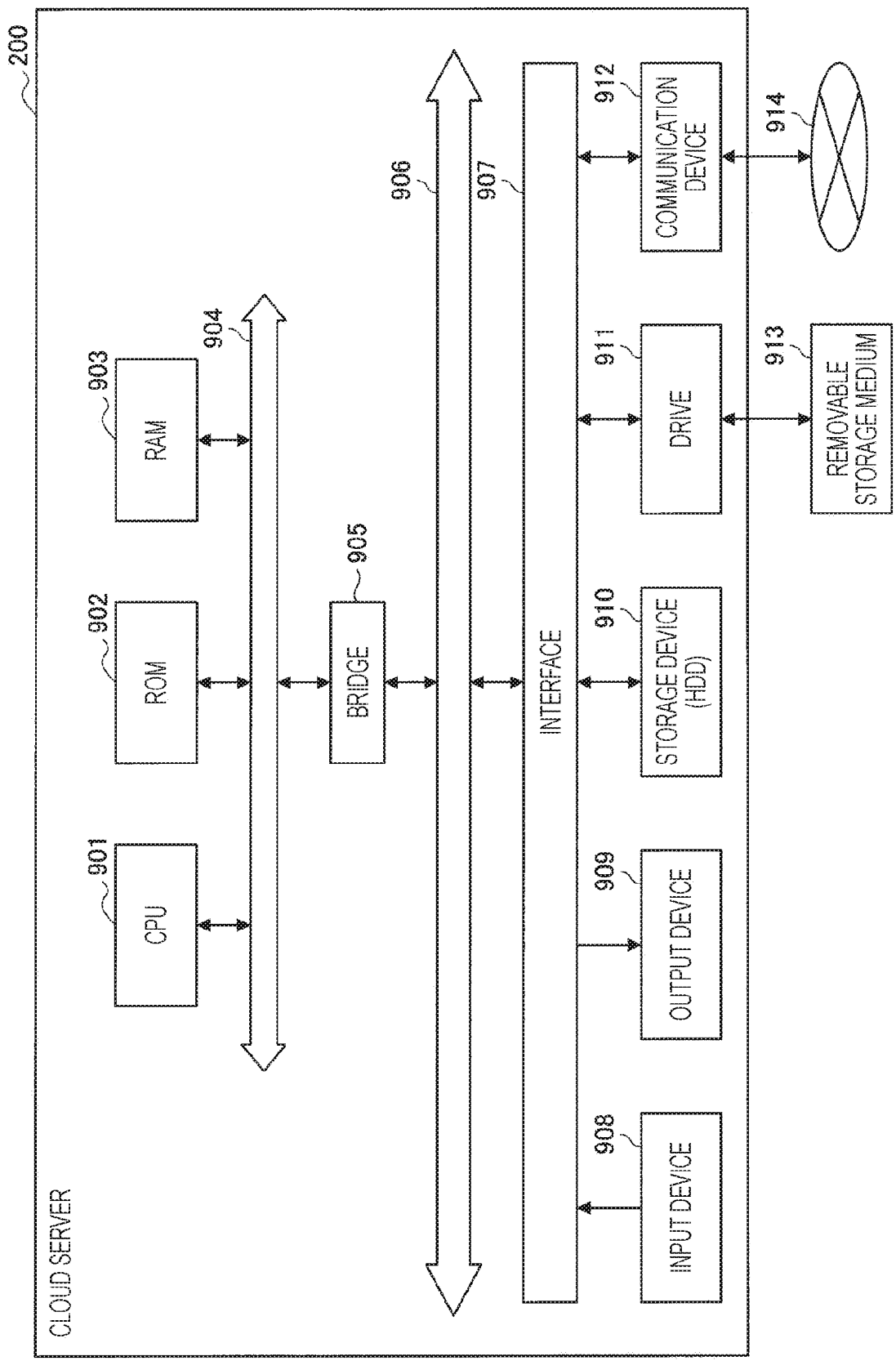
FIG. 14 is a diagram showing a hardware configuration of a cloud server according to the embodiment.

FIG. 14 is a diagram showing a hardware configuration of the cloud server 200 according to the present embodiment. The cloud server 200 includes a central processing unit (CPU) 901, a read only memory (ROM) 902, a random access memory (RAM) 903, and a host bus 904. The cloud server 200 further includes a bridge 905, an external bus 906, an interface 907, an input device 908, an output device 909, a storage device (HDD) 910, a drive 911, and a communication device 912.

The CPU 901 functions as an arithmetic processing unit and a controller, and controls the overall operation in the cloud server 200 according to various programs. Furthermore, the CPU 901 may be a microprocessor. The ROM 902 stores programs, operation parameters, and the like used by the CPU 901. The RAM 903 temporarily stores programs used in the execution of the CPU 901, parameters and the like that appropriately change in the execution. These components are interconnected by the host bus 904 configured with a CPU bus or the like. The respective functions of the information acquisition unit 220, the processing unit 230, and the control unit 240 are achieved by the cooperation of the CPU 901, the ROM 902, and the RAM 903.

The host bus 904 is connected to the external bus 906 such as a peripheral component interconnect/interface (PCI) bus via the bridge 905. Note that the host bus 904, the bridge 905, and the external bus 906 are not necessarily separated, and functions of these components may be mounted on a single bus.

The input device 908 includes an input means used by a user to input information, such as a mouse, a keyboard, a touch panel, a button, a microphone, a switch, or a lever, an input control circuit that generates an input signal on the basis of an input from the user and outputs the generated input signal to the CPU 901, and the like. The user of the cloud server 200 can input various types of data to the cloud server 200 or instruct the cloud server 200 to perform processing operations by operating the input device 908.

The output device 909 includes, for example, a display device such as a cathode ray tube (CRT) display device, a liquid crystal display (LCD) device, an organic light emitting diode (OLED) device, and a lamp. The output device 909 also includes an audio output device such as a speaker and headphones. The output device 909 outputs, for example, played content. Specifically, the display device displays various types of information such as played video data as a text or an image. Meanwhile, the audio output device converts the played audio data or the like into a sound and outputs the sound.

The storage device 910 is a device for data storage configured as an example of the storage unit 250 of the cloud server 200 according to the present embodiment. The storage device 910 may include a storage medium, a recording device that records data in the storage medium, a reading device that reads data from the storage medium, a deletion device that deletes data recorded in the storage medium, and the like. The storage device 910 is configured with, for example, a hard disk drive (HDD). The storage device 910 drives a hard disk and stores programs executed by the CPU 901 and various types of data.

The drive 911 is a reader writer for storage media, and is built in or externally attached to the cloud server 200. The drive 911 reads information recorded in a removable storage medium 913 such as a magnetic disk, an optical disk, a magneto-optical disk, or a semiconductor memory which is loaded, and outputs the information to the RAM 903. The drive 911 can also write information in the removable storage medium 913.

The communication device 912 is, for example, a communication interface configured with a communication device or the like for connecting to the communication network 914. The function of the communication unit 210 is achieved by the communication device 912.

7. REMARKS

Note that an example where marks 10 having different features (for example, marks 10 having different colors, marks 10 having different shapes, marks 10 having different color arrangements, etc.) are attached to different ground markers 100 has been described above. However, the present disclosure is not limited thereto. For example, marks 10 having different features may be attached to the same ground marker 100.

Figure 15:
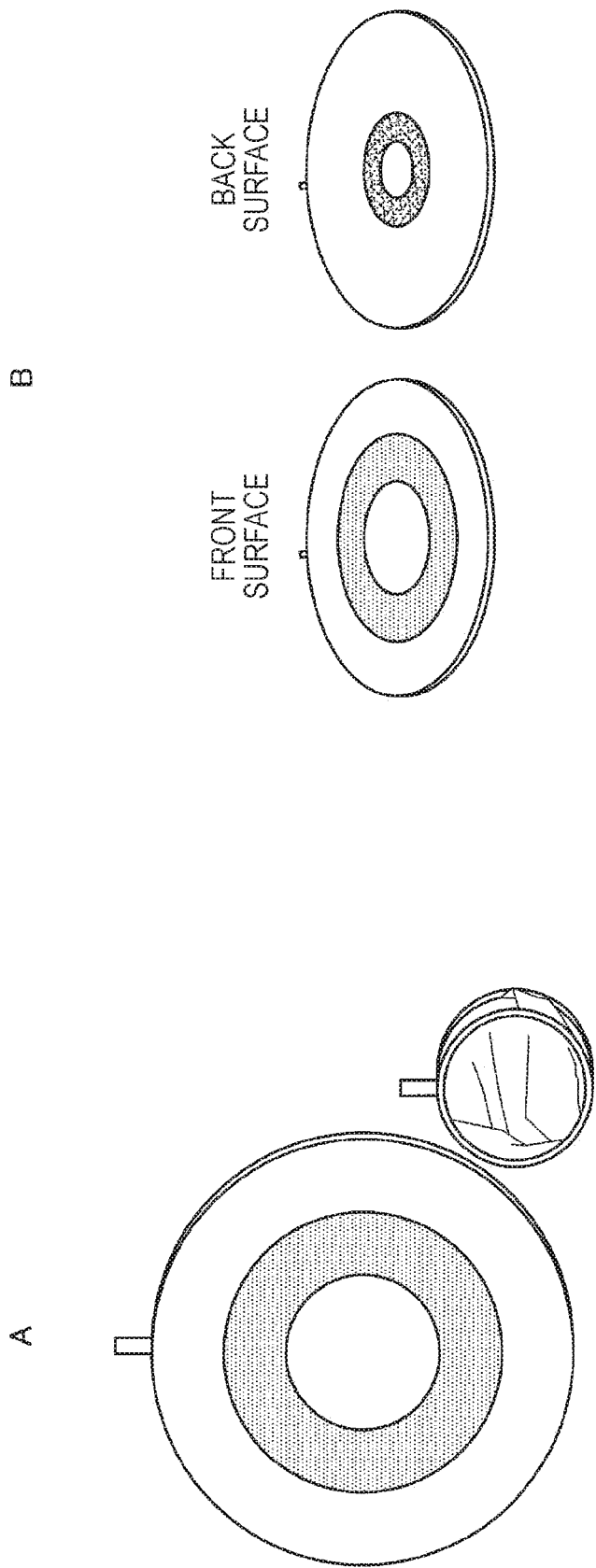
FIG. 15 is a diagram showing an example of a case where marks having different features are attached to the same ground marker.

FIG. 15 shows an example of a case in which marks 10 having different features are attached to the same ground marker 100. As shown in FIG. 15B, marks 10 having different features may be attached to the front surface and the back surface of the same ground marker 100. Thus, the implementer can change the mark 10, as appropriate, by one type of ground marker 100. Furthermore, as shown in FIG. 15A, a mechanism capable of folding the ground marker 100 may be provided to the ground marker 100. As a result, the ground marker 100 is folded up into a small size when being carried, whereby burdens on the carrier is reduced, and during aerial photographing, the ground marker 100 is developed, so that the larger mark 10 can be installed.

8. CONCLUSION

As described above, according to one embodiment of the present disclosure, a plurality of types of ground markers 100 having marks 10 of different sizes is used, and the marks 10 attached to the respective ground markers 100 have different features depending on their sizes. More specifically, the marks 10 attached to the respective ground markers 100 have different colors, color arrangements, shapes, or the like according to their sizes. Thus, the apparatus for analyzing the captured image detects information regarding the feature of the mark 10 from the captured image, assesses the size of the mark 10 on the basis of the detected feature, and sets a parameter on the basis of the size, thereby detecting the mark 10. As a result, the soil volume measurement system according to the present embodiment can set a parameter suitable for detecting the mark 10, so that the detection accuracy of the mark 10 can be improved.

While the preferred embodiments of the present disclosure have been described in detail with reference to the accompanying drawings, the technical scope of the present disclosure is not limited to such examples. It is apparent that those skilled in the art in the technical field of the present disclosure could conceive of various changes or modifications within the scope of the technical concept described in the claims, and it is understood that they are obviously encompassed in the technical scope of the present disclosure.

For example, in the above embodiment, the mark 10 is detected for measuring a volume of soil. However, the volume of soil can be measured by directly detecting the ground marker 100 instead of the mark 10.

Furthermore, the processes performed by the cloud server 200 can be performed by the drone 300 instead of the cloud server 200. Furthermore, the processes performed by the cloud server 200 can be shared by the drone 300 and the cloud server 200. In other words, although the cloud server 200 analyzes the captured image in the above embodiment, the drone 300 may analyze a part or entire of the captured image. For example, the drone 300 may capture an image, analyze the generated captured image in real time, and transmit the analysis result to the cloud server 200. Furthermore, the drone 300 may autonomously fly on the basis of the analysis result of the captured image.

Furthermore, although the drone 300 is used in the above embodiment, the present disclosure is not limited thereto, and for example, an artificial satellite, a flight vehicle operated by a person, or the like may be used.

Note that, although the cloud server 200 is used in the above embodiment, the configuration is not limited thereto, and any servers other than the cloud server 200 may be used.

Furthermore, although the cloud server 200 analyzes the captured image data received from the drone 300, and detects the mark 10 in the above embodiment, the configuration is not limited thereto. In other words, the control device 400 may perform the process for detecting the ground marker 100 from the captured image data acquired from the drone 300 according to the operation performed by the operator.

Furthermore, paper, plastic or the like on which a predetermined figure is printed can be used as the ground marker 100. Furthermore, a stack of flat materials such as plastic or rubber having a predetermined shape can be used as the ground marker 100. Moreover, a display panel such as a liquid crystal display (LCD) or an organic electro luminescence (EL) display for displaying a predetermined figure can be used as the ground marker 100. Furthermore, a material that is expanded and developed like a reflex board can be used as the ground marker 100.

Furthermore, in the examples of setting a parameter shown in FIGS. 5, 11, 12, and 13, at the boundary altitude (threshold) at which the parameter is changed, a parameter corresponding to the altitude lower than the boundary altitude may be set or a parameter corresponding to the altitude higher than the boundary altitude may be set. For example, in a case where it is assessed that the small mark 13 is captured in FIG. 5, the parameter A3 or the parameter A2 may be set at the altitude of 40 [m]. The same applies to the other boundary altitudes, other marks, and other drawings.

Furthermore, although the present disclosure is applied to a soil volume measurement system in the above embodiment, it is not limited thereto. The present disclosure may be applied to other systems and other apparatuses. For example, the present disclosure may be applied to an autonomous driving system and the like.

Furthermore, the effects described in the present specification are merely illustrative or exemplary, and are not limitative. That is, the technique according to the present disclosure can provide other effects obvious to those skilled in the art from the description of the present specification, along with or in place of the above-described effects.

Note that the following configurations are also included within the technical scope of the present disclosure.

(1)
An information processing apparatus including:
an acquisition unit that acquires a captured image;
a detection unit that detects a feature of a target object in the captured image; and
a determination unit that determines, on the basis of the feature, a parameter used for an assessment of whether or not the target object is a predetermined object.

(2)
The information processing apparatus according to the abovementioned (1),
in which the determination unit identifies the size of the target object on the basis of the feature, and determines the parameter on the basis of the size.

(3)
The information processing apparatus according to the abovementioned (2),
in which the determination unit identifies which of a plurality of candidates corresponds to the size on the basis of the feature.

(4)
The information processing apparatus according to any one of the abovementioned (1) to (3),
in which the feature is a color or a color arrangement applied to the target object.

(5)
The information processing apparatus according to the abovementioned (4),
in which, in a case where different colors are applied to the target object so as to be adjacent to each other, hues corresponding to the respective colors differ by a predetermined threshold or more.

(6)
The information processing apparatus according to any one of the abovementioned (1) to (3),
in which the feature is a shape of the target object.

(7)
The information processing apparatus according to the abovementioned (6),
in which the shape includes a shape in which a plurality of circles having different radii is arranged concentrically.

(8)
The information processing apparatus according to any one of the abovementioned (1) to (7),
in which the acquisition unit acquires information regarding an altitude at which the captured image is captured, and
the determination unit determines the parameter also on the basis of the altitude.

(9)
The information processing apparatus according to any one of the abovementioned (1) to (8), further including
an assessment unit that performs the assessment using the parameter.

(10)
The information processing apparatus according to any one of the abovementioned (1) to (9),
in which the target object is a mark attached to a ground marker.

(11)
An information processing method executed by a computer, the method including:
acquiring a captured image;
detecting a feature of a target object in the captured image; and
determining, on the basis of the feature, a parameter used for an assessment of whether or not the target object is a predetermined object.

(12)
A program for causing a computer to execute:
acquiring a captured image;
detecting a feature of a target object in the captured image; and
determining, on the basis of the feature, a parameter used for an assessment of whether or not the target object is a predetermined object.

(13)
A ground marker system including:
a first ground marker provided with a first mark having a first feature; and
a second ground marker provided with a second mark having a second feature different from the first feature,
in which the size of the first mark and the size of the second mark are different from each other.

(14)
The ground marker system according to the abovementioned (13),
in which the first feature is a color or a color arrangement of the first mark, and
the second feature is a color or a color arrangement of the second mark.

(15)

The ground marker system according to the abovementioned (14), in which, in a case where different colors are applied so as to be adjacent to each other, hues corresponding to the respective colors differ by a predetermined threshold or more, or one of the colors is black.

(16)

The ground marker system according to the abovementioned (13), in which the first feature is a shape of the first ground marker, and the second feature is a shape of the second ground marker.

(17)

The ground marker system according to the abovementioned (16), in which the shape includes a shape in which a plurality of circles having different radii is arranged concentrically.

REFERENCE SIGNS LIST

100 Ground marker
200 Cloud server
210 Communication unit
220 Information acquisition unit
230 Processing unit
231 Candidate area extraction unit
232 Feature amount extraction unit
233 Mark detection unit
234 Soil volume measurement unit
240 Control unit
250 Storage unit
300 Drone
400 Control device

The invention claimed is:

1. An information processing apparatus comprising circuitry configured to:
   acquire a captured image and information reading an altitude at which the captured image is captured;
   detect a feature of a target object in the captured image;
   determine a size of the target object on basis of a combination of the detected feature and the altitude information;
   determine a parameter used for an assessment of whether or not the target object is a predetermined object based on the altitude information and the determined size of the target object; and
   detect the target object is the predetermined object based on the predetermined parameter.

2. The information processing apparatus according to claim 1, wherein the circuitry is further configured to identify which of a plurality of candidates corresponds to the size on the basis of the feature.

3. The information processing apparatus according to claim 1,
   wherein the feature is a color or a color arrangement applied to the target object.

4. The information processing apparatus according to claim 3,
   wherein, in a case where different colors are applied to the target object so as to be adjacent to each other, hues corresponding to the respective colors differ by a predetermined threshold or more.

5. The information processing apparatus according to claim 1,
   wherein the feature is a shape of the target object.

6. The information processing apparatus according to claim 5,
   wherein the shape includes a shape in which a plurality of circles having different radii is arranged concentrically.

7. The information processing apparatus according to claim 1, wherein the circuitry is further configured to perform the assessment using the parameter.

8. The information processing apparatus according claim 1,
   wherein the target object is a mark attached to a ground marker.

9. An information processing method executed by a computer, the method comprising:
   acquiring a captured image and information reading an altitude at which the captured image is captured;
   detecting a feature of a target object in the captured image;
   determining a size of the target object on basis of a combination of the detected feature and the altitude information;
   determining a parameter used for an assessment of whether or not the target object is a predetermined object based on the altitude information and the determined size of the target object; and
   detecting the target object is the predetermined object based on the predetermined parameter.

10. A non-transitory readable medium, having instructions stored therein that when executed by a processor perform a method comprising:
    acquiring a captured image and information reading an altitude at which the captured image is captured;
    detecting a feature of a target object in the captured image;
    determining a size of the target object on basis of a combination of the detected feature and the altitude information;
    determining a parameter used for an assessment of whether or not the target object is a predetermined object based on the altitude information and the determined size of the target object; and
    detecting the target object is the predetermined object based on the predetermined parameter.

11. The information processing apparatus according to claim 1 wherein the circuitry is further configured to assess that the target object is a first ground marker provided with a first mark having a first feature or a second ground marker provided with a second mark having a second feature different from the first feature based on the altitude and size of the target object,
    wherein a size of the first mark and a size of the second mark are different from each other.

12. The information processing apparatus according to claim 11,
    wherein the first feature is a color or a color arrangement of the first mark, and
    the second feature is a color or a color arrangement of the second mark.

13. The information processing apparatus according to claim 12,
    wherein, in a case where different colors are applied so as to be adjacent to each other, hues corresponding to the respective colors differ by a predetermined threshold or more, or one of the colors is black.

14. The information processing apparatus according to claim 11,
 wherein the first feature is a shape of the first ground marker, and
 the second feature is a shape of the second ground marker.

15. The information processing apparatus according to claim 14,
 wherein the shape includes a shape in which a plurality of circles having different radii is arranged concentrically.

16. The information processing apparatus according to claim 1, wherein the circuitry is further configured to determine the size of the target object on a basis of a focal length at which the image was captured.

* * * * *